US012154444B2

(12) United States Patent
Yankanchi et al.

(10) Patent No.: US 12,154,444 B2
(45) Date of Patent: Nov. 26, 2024

(54) SYSTEMS AND METHODS FOR ENHANCED SITUATIONAL AWARENESS AND AUTO TOGA

(71) Applicant: HONEYWELL INTERNATIONAL INC., Charlotte, NC (US)

(72) Inventors: Adarsh Yankanchi, Bangalore (IN); Dhana Lakshmi Tatina, Bangalore (IN); Shohab Abdul Hameed Basargod Mohammed, Bangalore (IN); Vinaya Kumara Sannabasappa Bandakala, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 153 days.

(21) Appl. No.: 17/303,964

(22) Filed: Jun. 11, 2021

(65) Prior Publication Data

US 2022/0343778 A1 Oct. 27, 2022

(30) Foreign Application Priority Data

Apr. 27, 2021 (IN) ............................ 202111019320

(51) Int. Cl.
*G08G 5/02* (2006.01)

(52) U.S. Cl.
CPC .................................. *G08G 5/025* (2013.01)

(58) Field of Classification Search
CPC .................................................... G08G 5/025
See application file for complete search history.

(56) References Cited

U.S. PATENT DOCUMENTS

| | | | | |
|---|---|---|---|---|
| 3,801,049 | A | 4/1974 | Simpson et al. | |
| 3,847,328 | A | 11/1974 | Simpson et al. | |
| 4,319,219 | A | 3/1982 | Rein-Weston | |
| 5,142,478 | A | 8/1992 | Crook | |
| 7,068,187 | B2 | 6/2006 | Ishihara et al. | |
| 10,759,523 | B2 | 9/2020 | Schmidt | |
| 2016/0247406 | A1 | 8/2016 | Khatwa et al. | |
| 2020/0258404 | A1 * | 8/2020 | Thompson | G05D 1/0676 |
| 2021/0221530 | A1 * | 7/2021 | Venkataramana | B64D 45/0059 |

FOREIGN PATENT DOCUMENTS

| | | | | |
|---|---|---|---|---|
| EP | 3561630 | A1 * | 10/2019 | B64D 45/08 |

* cited by examiner

*Primary Examiner* — Jason Holloway
*Assistant Examiner* — Christopher A Buksa
(74) *Attorney, Agent, or Firm* — Lorenz & Kopf LLP

(57) ABSTRACT

A method in an aircraft is disclosed. The method includes: arming an automatic TOGA flight operating mode when a predetermined condition has been detected, and monitoring for a TOGA trigger condition. When operating in a first mode, the method includes: generating and causing a TOGA advisory to be provided to flight crew, advising that an automatic TOGA will be executed, and triggering and causing the TOGA to be executed. When operating according in a second mode, the method includes: generating and causing a TOGA advisory to be provided to flight crew, advising the flight crew to manually trigger a TOGA, and triggering and causing the TOGA to be executed if the flight crew did not trigger the TOGA. When operating in a third mode, generating, and causing a TOGA advisory to be provided to flight crew and advising the flight crew to manually trigger a TOGA.

20 Claims, 9 Drawing Sheets

SYSTEMS AND METHODS FOR ENHANCED SITUATIONAL AWARENESS AND AUTO TOGA

CROSS REFERENCE TO RELATED APPLICATION

This application claims priority to Indian Provisional Patent Application No. 202111019320, filed Apr. 29, 2021, the entire content of which is incorporated by reference herein.

TECHNICAL FIELD

Embodiments of the subject matter described herein relate generally to systems and methods for landing an aircraft. More particularly, embodiments of the subject matter relate to systems and methods for automatically or coordinately triggering take-off-and-go-around maneuvers in aircraft.

BACKGROUND

Many fatal accidents in commercial flights occur during an aircraft's final descent and landing. Accidents may occur due to aircraft landed inappropriately with issues such as long landing, short landing, landing with incorrect landing configuration, runway incursion, aircraft not aligned to runway during approach, high speed, high rate of descent, not enough deceleration on runway after landing, etc. This can occur because the pilot is not aware of the underlying problem that might lead to unsafe landing or a crash.

Hence, it is desirable to provide systems and methods for monitoring various types of aircraft and flight data and triggering and/or alerting the flight crew to initiate a TOGA when needed. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a flight deck system for enabling or overriding an automatically triggered or coordinately triggered TOGA (take-off and go-around) maneuver during approach or landing operations is disclosed. The flight deck system includes a controller configured to: arm an automatic TOGA flight operating mode when a predetermined TOGA arming condition has been detected; and monitor, after the automatic TOGA flight operating mode has been armed, for a TOGA trigger condition. Wherein when operating in a first mode and a TOGA trigger condition has been detected that has not been overridden within a predetermined trigger condition overriding time the controller is configured to: generate and cause a TOGA advisory to be provided to flight crew that informs of the detected trigger condition and advises that an automatic TOGA maneuver will be executed, and trigger and cause the automatic TOGA maneuver to be executed if the automatic TOGA maneuver is not overridden by flight crew. Wherein when operating in a second mode and a TOGA trigger condition has been detected that has not been overridden within a predetermined trigger condition overriding time the controller is configured to: generate and cause a TOGA advisory to be provided to flight crew that informs of the detected trigger condition and advises the flight crew to manually trigger a TOGA maneuver, and trigger and cause a TOGA maneuver to be executed if the flight crew neither manually triggers nor overrides the automatic TOGA maneuver within a predetermined period of time. And wherein when operating in a third mode and a TOGA trigger condition has been detected that has not been overridden within a predetermined trigger condition overriding time the controller is configured to generate and cause a TOGA advisory to be provided to flight crew that informs of the detected trigger condition and advises the flight crew to manually trigger a TOGA maneuver if the automatic TOGA trigger is not overridden by flight crew.

In another embodiment, a processor-implemented method in an aircraft for enabling or overriding an automatically triggered or coordinately triggered TOGA (take-off and go-around) maneuver during approach or landing operations is disclosed. The method includes: arming, by the processor, an automatic TOGA flight operating mode when a predetermined TOGA arming condition has been detected; and monitoring, by the processor, after the automatic TOGA flight operating mode has been armed, for a TOGA trigger condition. Wherein when operating in a first mode and a TOGA trigger condition has been detected that has not been overridden within a predetermined trigger condition overriding time, the method further includes: generating and causing a TOGA advisory to be provided to flight crew that informs of the detected trigger condition and advises that an automatic TOGA maneuver will be executed, and triggering and causing the automatic TOGA maneuver to be executed if the automatic TOGA maneuver is not overridden by flight crew. Wherein when operating in a second mode and a TOGA trigger condition has been detected that has not been overridden within a predetermined trigger condition overriding time, the method further includes: generating and causing a TOGA advisory to be provided to flight crew that informs of the detected trigger condition and advises the flight crew to manually trigger a TOGA maneuver, and triggering and causing a TOGA maneuver to be executed if the flight crew neither manually triggers nor overrides the automatic TOGA maneuver within a predetermined period of time. And wherein when operating in a third mode and a TOGA trigger condition has been detected that has not been overridden within a predetermined trigger condition overriding time, the method further includes generating and causing a TOGA advisory to be provided to flight crew that informs of the detected trigger condition and advises the flight crew to manually trigger a TOGA maneuver if the automatic TOGA trigger is not overridden by flight crew.

In another embodiment, disclosed is a non-transitory computer-readable medium having stored thereon instructions that when executed by a processor cause the processor to perform a method in an aircraft for enabling or overriding an automatically triggered or coordinately triggered TOGA (take-off and go-around) maneuver during approach or landing operations. The method includes: arming an automatic TOGA flight operating mode when a predetermined TOGA arming condition has been detected; and monitoring, after the automatic TOGA flight operating mode has been armed, for a TOGA trigger condition. When operating in a first mode and a TOGA trigger condition has been detected that has not been overridden within a predetermined trigger condition overriding time, the method further includes: generating and causing a TOGA advisory to be provided to flight crew that informs of the detected trigger condition and advises that an automatic TOGA maneuver will be executed, and triggering and causing the automatic TOGA maneuver to be executed if the automatic TOGA maneuver is not overridden by flight crew. When operating in a second mode and a TOGA trigger condition has been detected that has not been overridden within a predetermined trigger condition overriding time, the method further includes: generating and causing a TOGA advisory to be provided to flight crew that informs of the detected trigger condition and advises the flight crew to manually trigger a TOGA maneuver, and triggering and causing a TOGA maneuver to be executed if the flight crew neither manually triggers nor overrides the automatic TOGA maneuver within a predetermined period of time. And, when operating in a third mode and a TOGA trigger condition has been detected that has not been overridden within a predetermined trigger condition overriding time, the method further includes generating and causing a TOGA advisory to be provided to flight crew that informs of the detected trigger condition and advises the flight crew to manually trigger a TOGA maneuver if the automatic TOGA trigger is not overridden by flight crew.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
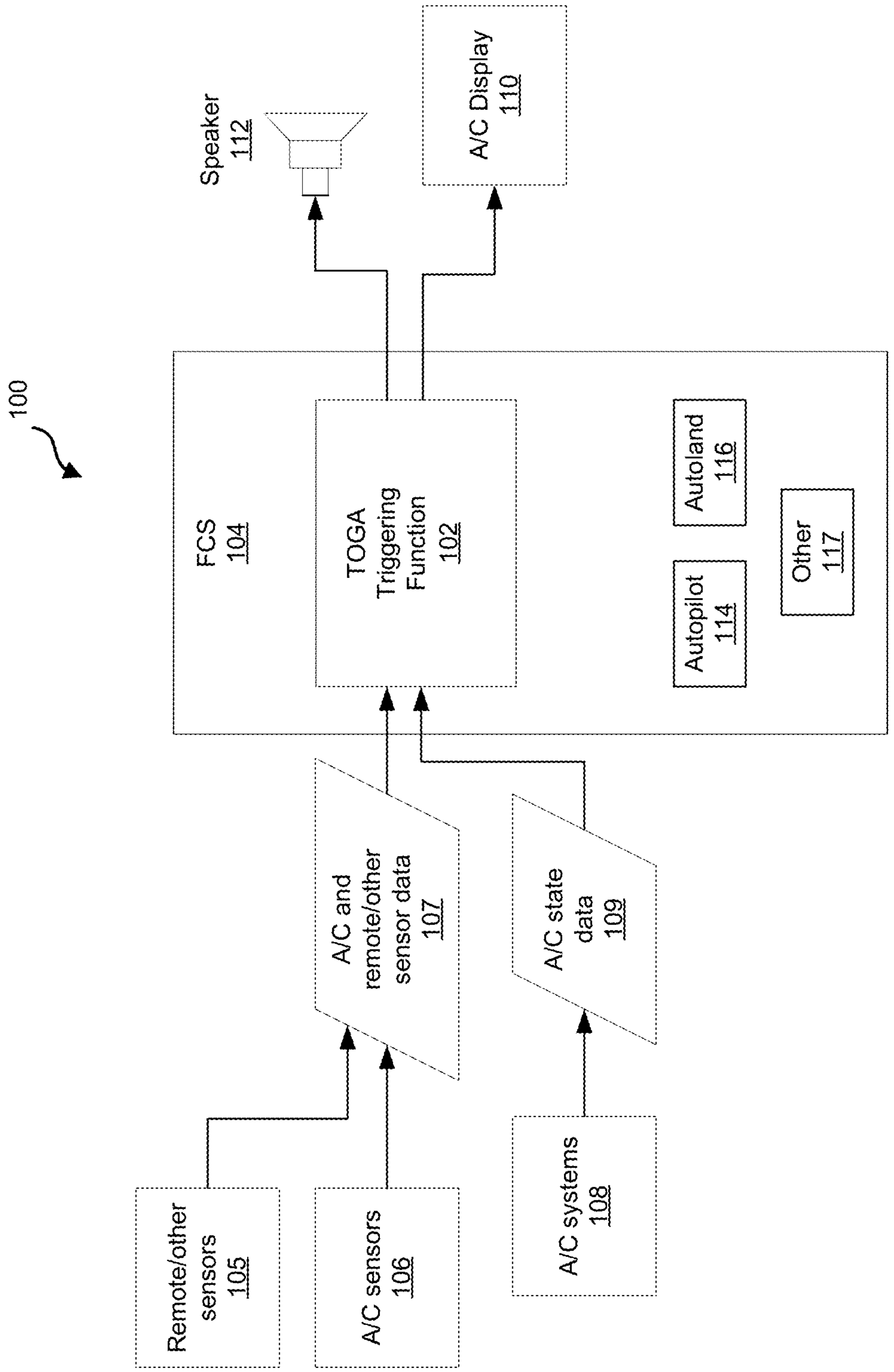
FIG. 1 is a block diagram depicting an example aircraft environment in which an example TOGA triggering function is provided, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for enabling or overriding an automatically triggered or coordinately triggered TOGA (take-off and go-around) maneuver during approach or landing operations. The apparatus, systems, techniques, and articles provided herein can provide the necessary safety information for landing and thereby calling (aural advisory) the pilot to trigger TOGA or automatically triggering TOGA when it is ascertained that the landing is not safe. Once the TOGA is triggered and aircraft reaches the required safe altitude, it provides another opportunity for the flight crew to assess the situation and modify/adjust for the required flight/environment feature and re-attempt a safer landing.

The apparatus, systems, techniques, and articles provided herein can indicate to flight crew that a TOGA is necessary when a hazard to safety of flight during landing is detected. The apparatus, systems, techniques, and articles provided herein can automatically trigger TOGA when hazard to safety of flight during landing is detected. The apparatus, systems, techniques, and articles provided herein can monitor flight and environment parameters for additional situational awareness. The apparatus, systems, techniques, and articles provided herein includes provisions for prediction and/or detection of hazard to safety of flight. The apparatus, systems, techniques, and articles provided herein can provide a safer approach to solve problems like long landing, short landing, landing with incorrect landing configuration, runway incursion, aircraft not aligned to runway during approach, high speed, high rate of descent, not enough deceleration on runway after landing, etc. The apparatus, systems, techniques, and articles provided herein can automatically detect and trigger TOGA instead of just manually detect hazard (by pilot to manually trigger TOGA) for safety of flight during landing. The apparatus, systems, techniques, and articles provided herein can provide, for purpose of emergency landings or landings with anomalies, a provision to override/disable automatic TOGA triggering before it gets activated/triggered. The apparatus, systems, techniques, and articles provided herein can provide cues for the pitch and roll to clear all the obstacles and reach safe altitude during a TOGA maneuver.

FIG. 1 is a block diagram depicting an example aircraft cockpit environment 100 in which an example TOGA (take-off and go-around) triggering function 102 is provided. The example aircraft environment 100 includes the example TOGA triggering function 102, a Flight Control System (FCS) 104, aircraft sensors 106 (e.g., GPS, radar), other sensors 105 (e.g., remote camera) and ground based sensors (e.g., radar), aircraft systems 108, a display device 110, and a speaker system 112.

The example TOGA triggering function 102 is configured for enabling or overriding an automatically triggered or coordinately triggered TOGA maneuver during approach or landing operations of an aircraft. The TOGA triggering function 102 may be implemented using the computing hardware that implements the FCS 104 or on separate computing hardware.

The TOGA triggering function 102 is implemented by a processing component such as a controller. The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable programming instructions, used by the processing component.

The example TOGA triggering function 102 comprises a plurality of conditions used for arming the system to trigger a TOGA (e.g., Aircraft is in approach and at or below 1000 feet altitude). Example TOGA arming conditions are listed below in Table 1. Arming TOGA starts at the flight phase listed in column 2 of Table 1 and continues until the end of landing or flight crew override of TOGA arming. When a proper combination of arming and triggering conditions occur, the example TOGA triggering function 102 is configured to trigger an automatic TOGA Advisory and/or a maneuver. Column 2 of table 1 lists a plurality of example arming conditions for arming TOGA (arming the TOGA triggering function). Column 3 lists a plurality of example predetermined conditions for causing the example TOGA triggering function 102 to actually trigger a TOGA advisory and/or TOGA maneuver after the example TOGA triggering function 102 has been armed based on the detected occurrence of a condition from Column 2 of Table 1.

The TOGA triggering function 102 is configured to retrieve sensor data 107 from one or more sensors 105/106 and aircraft system data 109 from one or more aircraft systems 108. The TOGA triggering function 102 is configured to monitor the aircraft system data 109 and/or sensor data 107 to determine based on the aircraft system data 109 and/or sensor data 107 whether a predetermined arming condition has occurred.

Once TOGA flight operating mode has been armed, the TOGA triggering function 102 monitors for specific conditions that could result in the need for the aircraft to perform a TOGA maneuver. Each automatic TOGA has one or more associated trigger conditions (aka, predetermined TOGA trigger condition). The TOGA triggering function 102 is configured to monitor aircraft system data 109 and/or sensor data 107 (such as object detection data) to determine, based on the aircraft system data 109 and/or sensor data 107, whether a predetermined TOGA trigger condition has occurred. Table 1, infra, lists example conditions under which automatic TOGA flight operating mode may be armed and trigger conditions under which an automatic TOGA advisory be issued and when applicable, also trigger a TOGA maneuver caused by the TOGA trigger condition detected.

TABLE 1

| SI no | Conditions when Auto TOGA is armed/activated (examples) | Conditions when TOGA is triggered or corresponding Advisory issued (examples) |
|---|---|---|
| 1 | Aircraft is in approach and at or below 1000 feet altitude. | Aircraft, vehicle, animal, trash, or any other obstruction is detected on the runway targeted for landing |
| 2 | | If the vertical speed is greater than 1000 feet/minute and aircraft has touchdown |
| 3 | | If the aircraft CAS is less than 5 knots or greater than 10 knots compared to the $V_{APP}$ computed. |
| 4 | | The rate of descent is greater than 1000 ft/min. |
| 5 | | If the landing gear is not extended or flaps are not 30/40. |
| 6 | Aircraft is in approach and below minimums. | A long/short landing is predicted using current flight data. |
| 7 | Aircraft is in flare. | Flare time detected is very high risking long landing. |
| 8 | | Aircraft deceleration in few seconds after landing (e.g., 10 seconds) is higher than that needed for aircraft to stop safely. |
| 9 | | Pitch attitude goes below 0° or above 10° |
| 10 | Aircraft is in approach | A wind shear of high intensity is detected. |
| 11 | | If the landing gear extension sequence has not completed within 30 seconds. |
| 12 | | Aircraft is not aligned to runway with excessive LOC or GLIDE deviation (greater than or equal to 1/4 dot LOC & 1 dot G/S respectively). |

TABLE 1-continued

| SI no | Conditions when Auto TOGA is armed/activated (examples) | Conditions when TOGA is triggered or corresponding Advisory issued (examples) |
|---|---|---|
| 13 | Aircraft is in approach and below 500 feet. | Aircraft has a bank angle of 7°. |
| 14 | Etc., and so on. | Relevant trigger conditions. |

Monitoring for a TOGA trigger condition may include monitoring A/C and remote/other sensor data 107 (such as object detection data) for a runway targeted for landing for a potential incursion threat. The object detection data 107 may include one or more of data from sensors such as LIDAR (Light Detection and Ranging), RADAR (Radio Detection And Ranging), a camera, ADS-B (Automatic Dependent Surveillance-Broadcast), ASDE-X (Airport Surface Detection Equipment, Model X), ASMGS (Advanced Surface Movement Guidance and Control System), Electro-Optical or Infrared Sensor.

Monitoring object detection data 107 may include analyzing the A/C and remote/other sensor data (such as object detection data) 107 to determine whether an object has been identified, the type of any object identified, and whether any identified object is a potential incursion threat. This may involve the use of machine learning techniques, etc. A potential incursion threat may include one or more of another aircraft, a ground vehicle, an animal, trash, aircraft/vehicle debris, a rock, and others on a runway targeted for landing.

Monitoring for a TOGA trigger condition may also include monitoring aircraft state information 109 (a type of aircraft system data retrieved from one or more aircraft systems 108) and A/C and remote/other sensor data 107 to determine the occurrence of one or more TOGA trigger conditions. The one or more TOGA trigger conditions determined from monitoring aircraft state information 109 may include one or more of: (i) an aircraft hard bounce during an attempted landing; (ii) a predicted aircraft long landing caused by altitude over a threshold level; (iii) a predicted aircraft long landing caused by longer flare; (iv) a predicted aircraft long or short landing caused by any reason leading to an un-stabilized approach (v) a late, non-deployed, or inappropriate use of a deceleration device; (vi) an airspeed being considerably higher than a proposed approach speed for the runway; (vii) a rate of descent that is too high for a required rate of decent for landing at 3 degree slope; (viii) a dangerously excessive wind shear; (ix) a landing configuration issue; (x) a landing gear extension problem or delay; (xi) the aircraft not being aligned to the targeted runway during landing; (xii) a bank angle being too high during approach; a pitch angle being too high during approach; (xiii) a flight critical parameter being inconsistent during approach; or (xiv) others.

The example TOGA triggering function 102 is configured to provide an option for allowing a flight crew member (e.g., pilot) to override a specific TOGA condition. The TOGA triggering function 102 provides a predetermined trigger condition overriding time for the flight crew to use to override a trigger condition before the TOGA triggering function 102 acts on the determination that a trigger condition has been detected. The predetermined trigger condition overriding time may be the same or different for different types of trigger conditions. When overridden, the example TOGA triggering function 102 disables the detection of the specific TOGA condition. Allowing for the predetermined trigger condition overriding time may be desired, for example, in case of a need for an emergency landing, or a landing with an anomaly. The TOGA triggering function 102 is configured to continue to monitor for a TOGA trigger condition, when it has been determined that a TOGA trigger condition has been detected and the flight crew has overridden the detected TOGA trigger condition within the predetermined trigger condition overriding time.

When an automatic TOGA flight operating mode has been armed and an associated TOGA trigger condition has been detected and has not been overridden within the predetermined trigger condition overriding time, the TOGA triggering function 102 is configured to generate an aural TOGA advisory and cause the aural TOGA advisory to be delivered to flight crew (e.g., via a speaker system 112, public address system, or other audio system onboard the aircraft) to inform of the detected trigger condition. The TOGA triggering function 102 may also be configured to generate a visual TOGA advisory and cause the visual TOGA advisory to be delivered to flight crew (e.g., via a display device 110) to inform of the detected trigger condition.

The FCS or other aircraft system may provide an autopilot function, an auto-land function, and/or other similar mode or function to automatically carry out TOGA for the aircraft. Based on a first aircraft configuration, when an autopilot function 114 or an auto-land function 116 is active or available or another similar mode with sufficient flight integrity 117 is active or available, the TOGA triggering function 102 is configured to provide a TOGA advisory, via the public address or speaker system 112 and/or display device 110, to flight crew to inform of the detected trigger condition and advise that an automatic TOGA will be executed, when an automatic TOGA flight operating mode has been armed and an associated TOGA trigger condition has been detected and has not been overridden within the predetermined trigger condition overriding time. Under these conditions, the TOGA triggering function 102 is also configured to trigger and cause an automatic TOGA to be executed (e.g., via the FCS 104).

Based on a second aircraft configuration, when an autopilot 114 or an auto-land function 116 is active or available or another similar mode sufficient flight integrity 117 exists for using the autopilot 114 and/or auto-land function 116 (and/or other similar mode or function 117), the TOGA triggering function 102 is configured to provide a TOGA advisory to flight crew to inform of the detected trigger condition and advise the flight crew to manually trigger TOGA, when an automatic TOGA flight operating mode has been armed and an associated TOGA trigger condition has been detected and has not been overridden within the predetermined trigger condition overriding time. Under these conditions, the TOGA triggering function 102 is also configured to trigger and cause an automatic TOGA to be executed (e.g., via the FCS 104) if the flight crew does not manually trigger TOGA within a predetermined period of time, and autopilot 114 and/or auto-land 116 and/or any other similar mode or function 117 with sufficient flight integrity to automatically carry out TOGA, are active or available.

Figure 2:
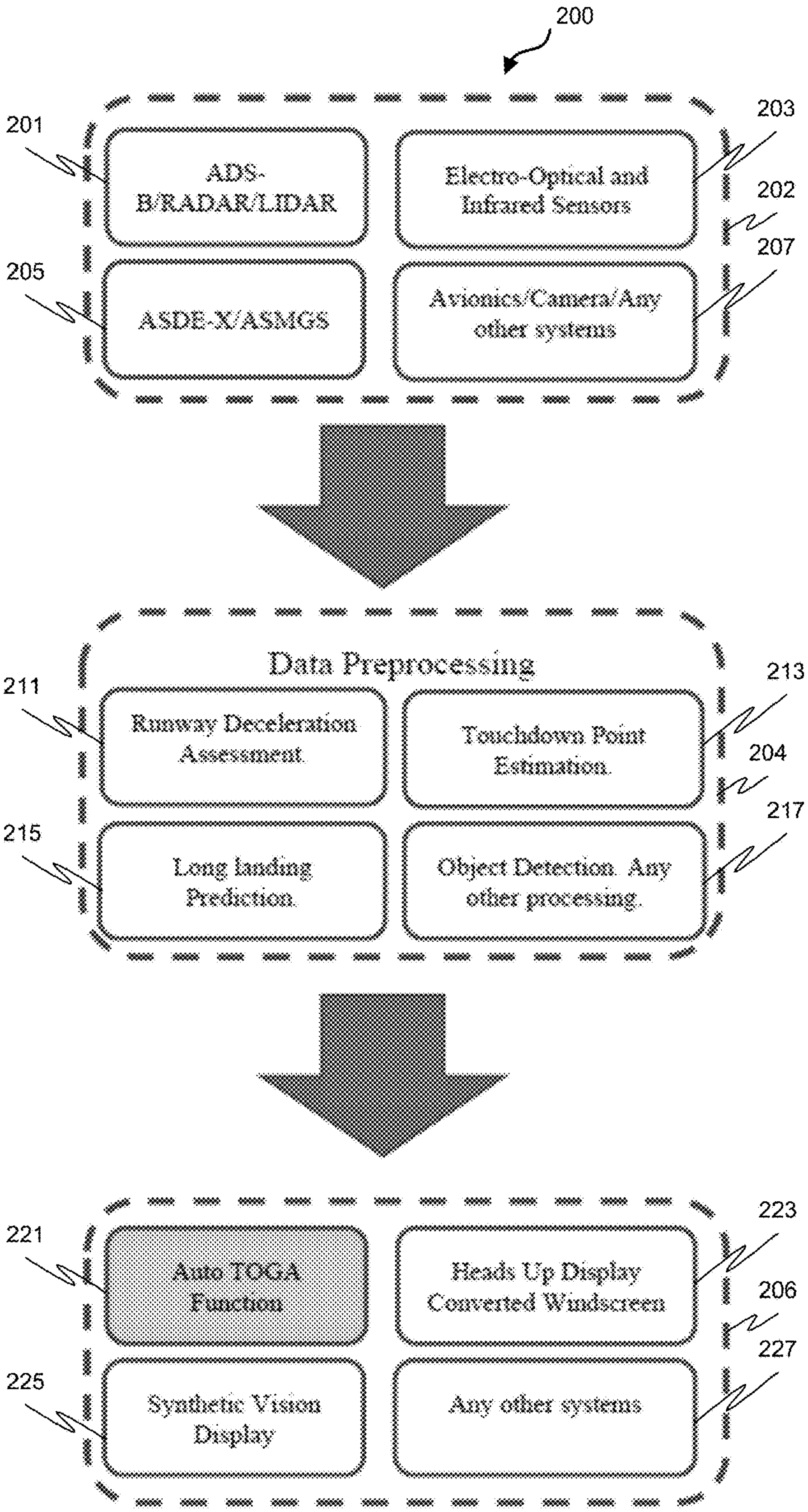
FIG. 2 is a process flow diagram depicting an example information flow to enable an auto TOGA function, in accordance with some embodiments.

Based on a third aircraft configuration, when an autopilot 114 or an auto-land 116 or a similar function 117 with sufficient flight integrity does not exist, the TOGA triggering function 102 is configured to provide the TOGA advisory to flight crew to inform of the detected trigger condition and advise the flight crew to manually trigger TOGA, when an automatic TOGA flight operating mode has been armed and an associated TOGA trigger condition has been detected and has not been overridden within the predetermined trigger condition overriding time. FIG. 2 is a process flow diagram depicting an example information flow 200 to enable an auto TOGA function. The order of operation within the information flow 200 is not limited to the sequential execution as illustrated in the figure but may be performed in one or more varying orders as applicable and in accordance with the present disclosure.

The example information flow 200 includes receiving sensor data (e.g., aircraft, remote, and ground-based sensor data) and aircraft system data (operation 202). The sensor data may include data from an automatic dependent surveillance-broadcast (ADS-B), Radar, and/or Lidar (RADAR/LIDAR 201), data from electro-optical and/or infrared sensors 203, Airport Surface Detection Equipment-Model X and/or Advanced Surface Movement Guidance and Control System (ASDE-X/ASMGS 105) data, and Avionics/Camera/ and other system data 207.

The example information flow 200 includes preprocessing the received sensor and aircraft system data (operation 204). Preprocessing the data may include processing the data to perform a runway deceleration assessment 211, processing the data to perform a touch down point estimation 213, processing the data to make a long landing prediction 215, and/or processing the data to perform object detection assessment 217 and other type of assessment.

The example information flow 200 includes determining based on the data preprocessing what action should be taken relating to approach, landing and/or a TOGA maneuver (operation 206). Determining the action to be taken may include activating an auto TOGA function 221, such as that performed by the example TOGA triggering function 102, generating obstacle data relating to a target runway for display on a heads up display converted windscreen 223, generating obstacle data relating to a target runway for display on a synthetic vision display 225, or generating data warranted for some other aircraft system 227 for assistance in TOGA Maneuver for safe landing.

The example TOGA triggering function 102 provides three (3) different Auto TOGA trigger mechanisms that provide different flexibilities. For example, Auto TOGA trigger mechanism 3 is most simple and can be deployed on aircraft where one has predetermined that TOGA will always be triggered by Pilot or if the aircraft itself does not have Autopilot/Autoland type of modes. Auto TOGA Trigger mechanisms 1 and 2 can be deployed on highly sophisticated aircraft with high Flight Control mode automations. Auto TOGA Trigger mechanism 2 initially provides an opportunity to flight crew to trigger the TOGA before the Auto TOGA function automatically triggers the TOGA maneuver whereas Auto TOGA Trigger mechanism 1 has provision for Auto TOGA function to automatically trigger TOGA without initially prompting the flight crew to trigger TOGA. These are example mechanisms which could be modified or there can be new mechanisms deployed.

Figure 3:
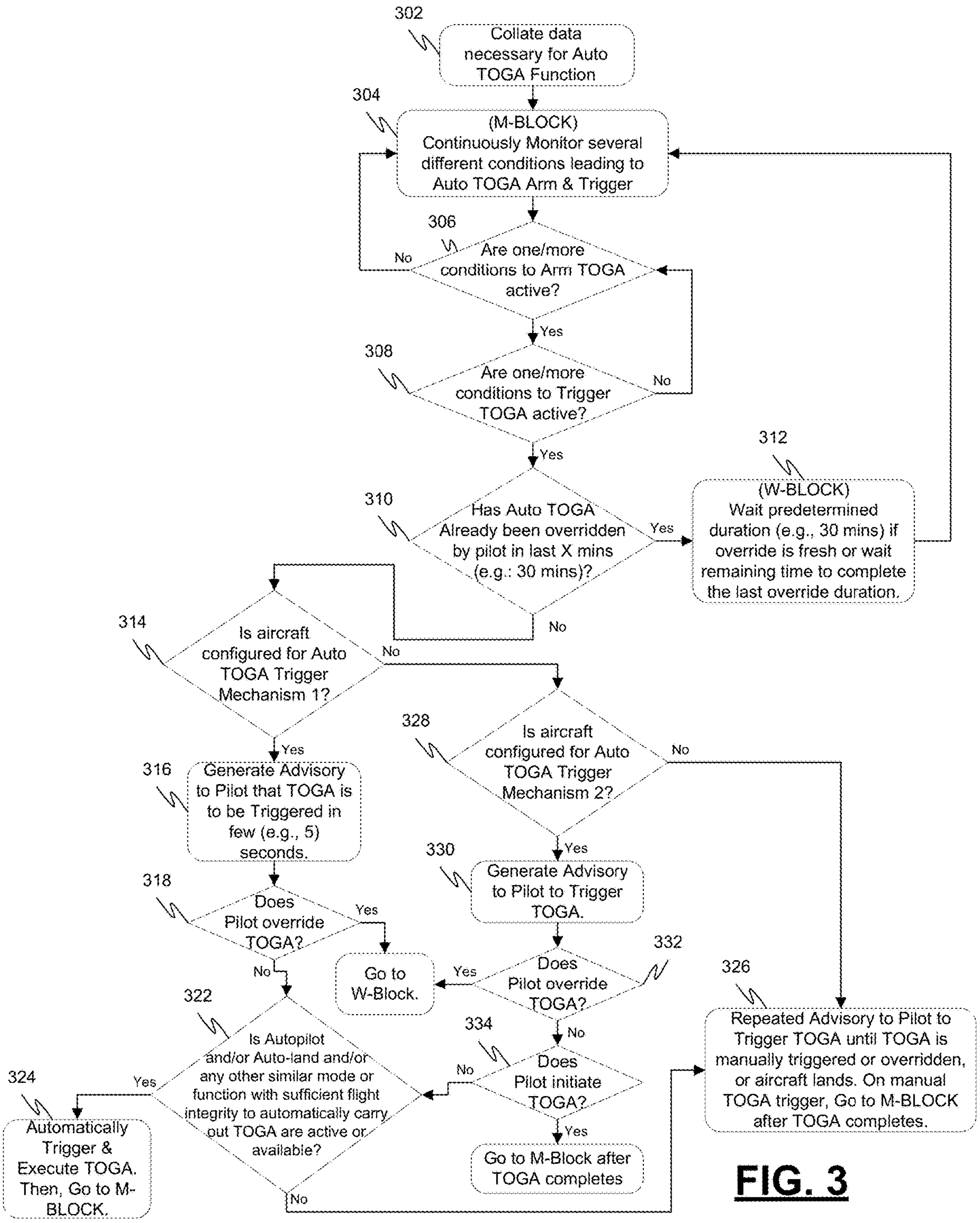
FIG. 3 is a process flow chart depicting an example processor-implemented process in an aircraft for enabling or overriding an automatically triggered or coordinately triggered TOGA maneuver during approach or landing operations, in accordance with some embodiments.

FIG. 3 is a process flow chart depicting an example processor-implemented process 300 in an aircraft for enabling or overriding an automatically triggered or coordinately triggered TOGA (take-off and go-around) maneuver during approach or landing operations. The order of operation within the process 300 is not limited to the sequential execution as illustrated in the figure but may be performed in one or more varying orders as applicable and in accordance with the present disclosure.

The example process 300 includes collating data necessary for an automatic TOGA triggering function (e.g., TOGA triggering function 102) or method (operation 302). The data may include information associated with aircraft safe landing such as data that can be processed to perform a runway deceleration assessment 211, a touch down point estimation 213, a long landing prediction 215, object detection assessment 217, and other types of assessment. The auto TOGA triggering function is built on top of a traditional TOGA function that may exist in an aircraft. To enhance flight crew situational awareness, situational awareness data may be consumed from one or more of the following systems (not limited to): ADS-B, RADAR, LIDAR, high resolution camera, electro-optical and infrared sensors, ASDE-X/ASMGS, and other avionics/systems that may be available to the aircraft. The situational awareness data may need some preprocessing. For example, in case of a camera that captures images of an obstruction on a runway, a deep learning based object detection model may be needed to confirm the type of object that is on the runway and to determine if the object is an obstruction to the landing aircraft.

The example process 300 includes continuously monitoring the collated data for indications of several different conditions that could lead to arming the auto triggering function and causing the auto triggering function to trigger a TOGA maneuver (operation 304). The collated data is monitored to allow the auto triggering function to detect a safety of flight condition that risks the safety of the landing aircraft during landing. Table 1, supra, lists example conditions under which example automatic TOGA flight operating modes may be armed and conditions under which a TOGA may be triggered, or a corresponding advisory issued based on the automatic TOGA flight operating mode that has been armed.

The example process 300 includes determining if one or more conditions to arm the auto TOGA triggering function is active (decision 306). If one or more conditions to arm the auto TOGA triggering function is not active (no at decision 306), then the example process 300 includes continuing to continuously monitor the collated data for indications of several different conditions that could lead to arming the auto triggering function and causing the auto triggering function to trigger a TOGA maneuver (operation 304).

If one or more conditions to arm the auto TOGA triggering function is active (yes at decision 306), then the example process 300 includes determining if one or more conditions to trigger TOGA is active (decision 308). If one or more conditions to trigger TOGA is not active (no at decision 308), then the example process 300 includes returning to determining if one or more conditions to arm TOGA is active (operation 306).

If one or more conditions to trigger TOGA is active (yes at decision 308), then the example process 300 includes determining if the condition to trigger TOGA has been overridden by a flight crew member within a predetermined overriding time interval (e.g., last 30 min) (decision 310). If a condition triggering TOGA has already been overridden by the flight crew within the predetermined overriding time interval (assuming it is time for the aircraft to be in approach again), the same condition will not be used to trigger the TOGA and will be overruled.

If the condition to trigger TOGA had been overridden by a flight crew member within the predetermined overriding time interval (yes at decision 310), then the example process 300 includes waiting a predetermined duration (e.g., 30 mins) if the override is fresh or wait remaining time to complete the last override duration (operation 312). The example process then includes continuing to continuously monitor the collated data for indications of several different conditions that could lead to arming the auto triggering function and causing the auto triggering function to trigger a TOGA maneuver (operation 304). If the condition to trigger TOGA has not been overridden by a flight crew member within the predetermined overriding time interval (no at decision 310), then the example process 300 includes determining if the aircraft is configured for a first auto trigger mechanism (decision 314). The first auto trigger mechanism allows the TOGA triggering function 102 to generate and cause a TOGA advisory to be provided to flight crew that informs of the detected trigger condition, advises that an automatic TOGA maneuver will be executed, and trigger and cause the automatic TOGA maneuver to be executed.

If the aircraft is configured for a first auto trigger mechanism (yes at decision 314), then the example process 300 includes generating an advisory (aural and/or visual) to the flight crew that TOGA is to be triggered in a predetermined automatic TOGA trigger period (e.g., 5 or 10 sec) (operation 316) and determining if the flight crew has overridden the TOGA within the predetermined automatic TOGA trigger period (decision 318). In some scenarios, such as emergency landing scenarios or when a faulty condition is known to the flight crew and is not correctable, the flight crew may override activation of an auto TOGA function. This enables the landing aircraft to continue landing without interruption, for example, during emergency landings.

If the flight crew has overridden the TOGA within the predetermined automatic TOGA trigger period (yes at decision 318), then the example process 300 includes waiting for a predetermined duration (e.g., 30 mins) if the override is fresh or wait remaining time to complete the last override duration (operation 312). The example process 300 then includes continuing to continuously monitor the collated data for indications of several different conditions that could lead to arming the auto triggering function and causing the auto triggering function to trigger a TOGA maneuver (operation 304). If the flight crew has not overridden the TOGA within the predetermined automatic TOGA trigger period (no at decision 318), then the example process 300 includes determining if the Autopilot and/or Auto-land and/or any other similar mode or function with sufficient flight integrity to automatically carry out TOGA are active or available (decision 322), and if yes at decision 322 automatically triggering the TOGA and executing the TOGA (operation 324) and after TOGA maneuver completion continuing to continuously monitor the collated data for indications of several different conditions that could lead to arming the auto triggering function and causing the auto triggering function to trigger a TOGA maneuver (operation 304).

If no at decision 322, the example process 300 includes repeating the advisory to flight crew to trigger TOGA until TOGA is manually triggered or overridden, or the aircraft lands (operation 326). If TOGA is manually triggered, after the TOGA Maneuver the example process 300 includes continuing to continuously monitor the collated data for indications of several different conditions that could lead to arming the auto triggering function and causing the auto triggering function to trigger a TOGA maneuver (operation 304).

If the aircraft is not configured for the first auto trigger mechanism (no at decision 314), then the example process 300 includes determining if the aircraft is configured for a second auto trigger mechanism (decision 328). The second auto trigger mechanism allows the TOGA triggering function 102 to provide a TOGA advisory to flight crew to inform of the detected trigger condition, advise the flight crew to manually trigger TOGA, and if the flight crew does not manually trigger TOGA within a predetermined period of time, automatically trigger TOGA.

If the aircraft is configured for the second auto trigger mechanism (yes at decision 328), then the example process includes generating an advisory (aural and/or visual) to the flight crew to manually trigger TOGA (operation 330) and determining if the flight crew has overridden the TOGA (decision 332). In some scenarios, such as emergency landing scenarios or when a faulty condition is known to the flight crew and is not correctable, the flight crew may override activation of an auto TOGA function. This enables the landing aircraft to continue landing without interruption, for example, during emergency landings.

If the flight crew has overridden the TOGA (yes at decision 332), then the example process 300 includes waiting a for a predetermined duration (e.g., 30 mins) if the override is fresh or wait remaining time to complete the last override duration (operation 312). The example process 300 then includes continuing to continuously monitor the collated data for indications of several different conditions that could lead to arming the auto triggering function and causing the auto triggering function to trigger a TOGA maneuver (operation 304). If the flight crew has not overridden the TOGA (no at decision 332), then the example process 300 includes determining if the flight crew has initiated TOGA (decision 334).

If the flight crew has not initiated the TOGA (no at decision 334), then the example process 300 determines if the Autopilot and/or Auto-land and/or any other similar mode or function with sufficient flight integrity to automatically carry out TOGA are active or available (decision 322), and if yes at decision 322 automatically triggering the TOGA and executing the TOGA (operation 324) and after TOGA Maneuver completion continuing to continuously monitor the collated data for indications of several different conditions that could lead to arming the auto triggering function and causing the auto triggering function to trigger a TOGA maneuver (operation 304). If no at decision 322, the example process 300 includes repeating the advisory to flight crew to trigger TOGA until TOGA is manually triggered or overridden, or the aircraft lands (operation 326). If TOGA is manually triggered, the example process 300 then after TOGA Maneuver completion includes continuing to continuously monitor the collated data for indications of several different conditions that could lead to arming the auto triggering function and causing the auto triggering function to trigger a TOGA maneuver (operation 304).

If the flight crew manually triggered the TOGA (yes at decision 334), then after TOGA Maneuver completion the example process 300 includes continuing to continuously monitor the collated data for indications of several different conditions that could lead to arming the auto triggering function and causing the auto triggering function to trigger a TOGA maneuver (operation 304).

If the aircraft is configured for the third auto trigger mechanism (no at decision 328), the example process 300 includes repeating the advisory to flight crew to trigger TOGA until TOGA is manually triggered or overridden, or the aircraft lands (operation 326). If TOGA is manually triggered, the example process 300 then after TOGA Maneuver completion includes continuing to continuously monitor the collated data for indications of several different conditions that could lead to arming the auto triggering function and causing the auto triggering function to trigger a TOGA maneuver (operation 304).

Figure 4:
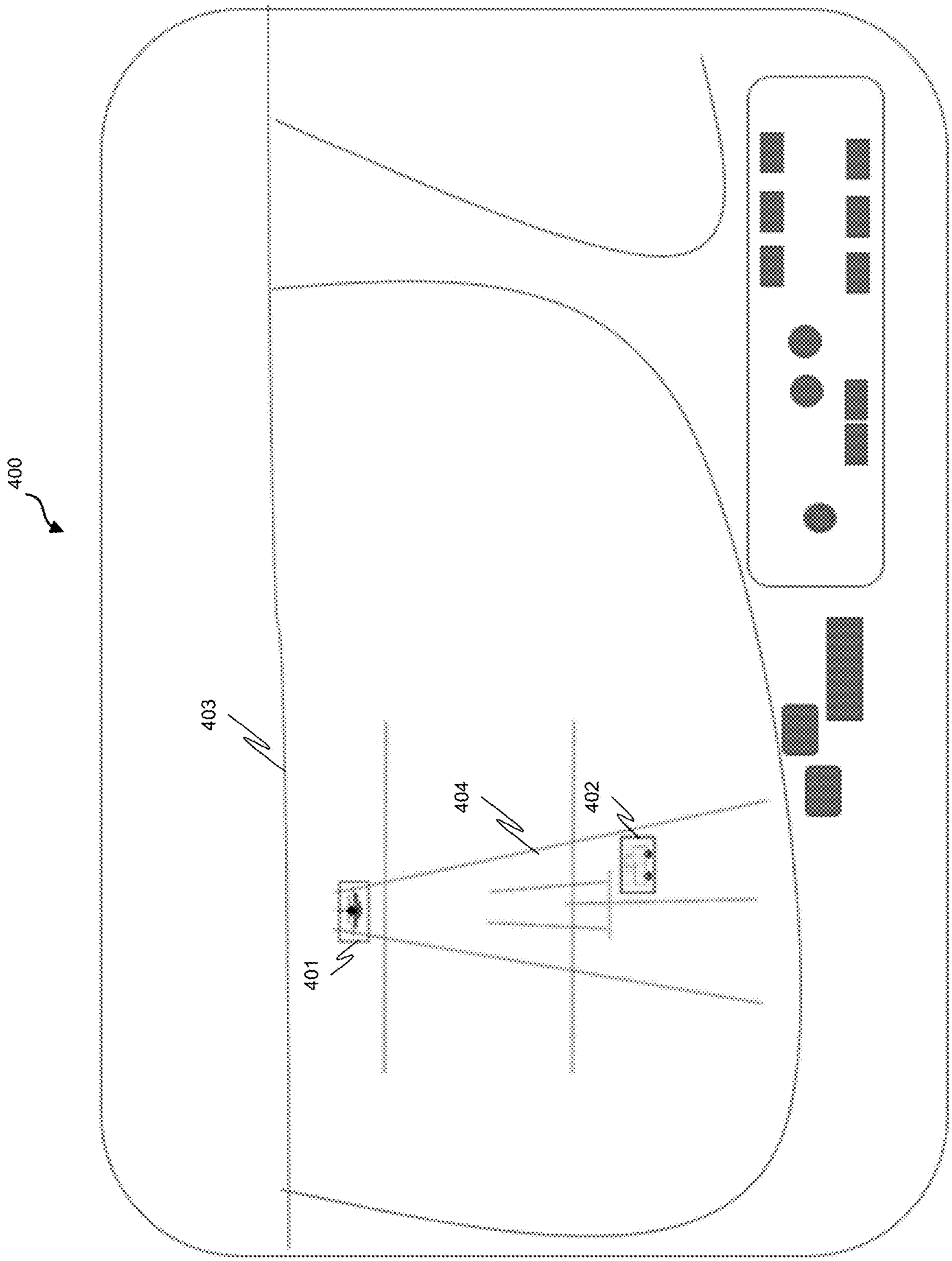
FIG. 4 is a block diagram depicting example systems in an aircraft cockpit, in accordance with some embodiments.

FIG. 4 is a block diagram depicting an example system 400 in an aircraft cockpit. The example system 400 includes, among other things, a heads up display converted windscreen 403. The windscreen 403, in this example, shows a landing runway 404. An onboard/offboard obstacle detection system (e.g., LIDAR based detection system) detected two potential obstacles, an aircraft 401 and a ground vehicle 402. In this example, the obstacle detection system generated rectangular boxes 401 and 402 for display on the wind screen/heads up display 403 indicating that an aircraft and vehicle, respectively, are located on the runway 404 targeted for landing. The indication (401 & 402) on the wind screen/heads up display 403 can be of any shape, color, and any dimension (1/2/3/n D, where n is number of dimensions). Also, the indication need not be on wind screen/heads up display itself and can be on any other display or non-display system (detect to automatically take corrective action which is to trigger a TOGA when a potential runway incursion/obstruction threat exists during landing). The incursion threat is not limited to another flight or ground vehicle, but it can also include other types of obstructions including, but not limited to, animals, trash, aircraft/vehicle debris, a rock, and others on a runway that will cause trigger of Auto TOGA.

The example TOGA triggering function 102, in this example, works in concert with the obstacle detection system. The obstacle detection system generates object detection data, which may include one or more of data from sensors (e.g., aircraft sensors 106 or other sensors 105) such as LIDAR, RADAR, a camera, ADS-B, ASDE-X, ASMGS, Electro-Optical or Infrared Sensor, or others. The TOGA triggering function 102 is configured to monitor object detection data, which may include analyzing the object detection data to determine whether an object has been identified, the type of any object identified, and whether any identified object is a potential incursion threat. This may involve the use of machine learning techniques, etc. A potential incursion threat may include one or more of another aircraft, a ground vehicle, an animal, trash, aircraft/vehicle debris, a rock, and others on a runway targeted for landing. When the example TOGA triggering function 102 is armed and detects a triggering condition, such as obstacle on a landing runway, the TOGA triggering function 102 is configured to generate an aural and/or visual TOGA advisory to flight crew to inform of the detected trigger condition.

Figure 5:
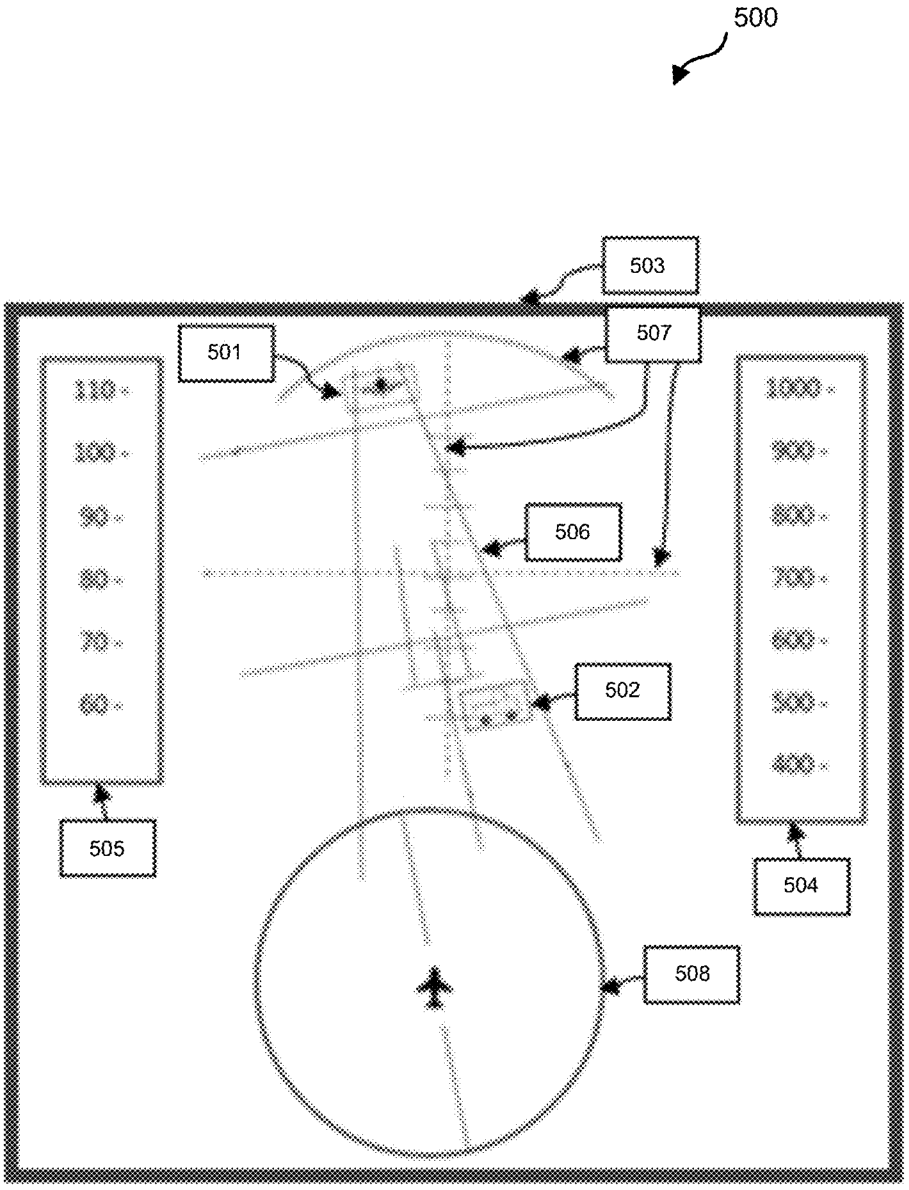
FIG. 5 is a block diagram depicting an-example display system in an aircraft cockpit, in accordance with some embodiments.

FIG. 5 is a block diagram depicting an example display system 500 in an aircraft cockpit. The example display system 500 includes, among other things, a Synthetic Vision Primary Flight Display (PFD) 503. The Synthetic Vision PFD 503, in this example, shows altitude 504, a velocity tape 505, the landing runway 506, a Flight Director 507, and a heading indication 508. An onboard/offboard obstacle detection system (e.g., LIDAR based detection system) detected two potential obstacles, an aircraft 501 and a ground vehicle 502. In this example, the obstacle detection system generated rectangular boxes 501 and 502 for display on the PFD 503 indicating that an aircraft and vehicle, respectively, are located on the runway 506 targeted for landing. The indication (501 and 502) on the PFD 503 can be of any shape, color, and any dimension (1/2/3/n D, where n is number of dimensions). The incursion threat is not limited to another flight or ground vehicle, but it can also be any other obstruction like animals, trash, aircraft/vehicle debris, a rock, and others on a runway that will cause trigger of Auto TOGA.

The example TOGA triggering function 102, in this example, works in concert with the obstacle detection system. The obstacle detection system generates object detection data, which may include one or more of data from aircraft sensors such as LIDAR, RADAR, a camera, ADS-B, ASDE-X, ASMGS, Electro-Optical or Infrared Sensor, or others. The TOGA triggering function 102 is configured to monitor object detection data, which may include analyzing the object detection data to determine whether an object has been identified, the type of any object identified, and whether any identified object is a potential incursion threat. This may involve the use of machine learning techniques, etc. A potential incursion threat may include one or more of another aircraft, a ground vehicle, an animal, trash, aircraft/vehicle debris, a rock, and others on a runway targeted for landing. When the example TOGA triggering function 102 is armed and detects a triggering condition, such as obstacle on a landing runway, the TOGA triggering function 102 is configured to generate an aural and/or visual TOGA advisory to flight crew to inform of the detected trigger condition.

The example TOGA triggering function 102 is configured to trigger a TOGA maneuver in various operating scenarios. In a first example, many airlines require aircraft to be stabilized by 1000 feet (at about 3 miles from the runway). When there is no stability at 1000 feet a TOGA is recommended. This makes 1000 feet a good starting point from where the TOGA triggering function 102 can be armed (active) for detecting runway obstruction and from there until touch down. During this armed period if a runway obstruction is detected, the TOGA triggering function 102 is configured to auto trigger a TOGA maneuver or provide an advisory to the flight crew to trigger a TOGA maneuver. Based on runway traffic the TOGA activation starting period can be reduced from 1000 feet altitude to even lesser altitude.

In a second example, after a hard bounce, the TOGA triggering function 102 is configured to auto trigger a TOGA to avoid porpoising which can break an aircraft. The porpoise oscillations occur so rapidly that Flight Control inputs to correct the oscillations are difficult to impossible. On a hard touch down, the tail of the aircraft is forced down due to inertia. This leads to the aircraft having a high angle of attack, which pushes the aircraft back in the air. After a hard bounce during an attempted landing, the safest thing may be to immediately execute a go-around.

The example TOGA triggering function 102 is configured to detect a hard touch down and cause an automatic TOGA maneuver to be triggered. A TOGA maneuver may require several systems to work together, and the example TOGA triggering function 102 does not require the flight crew to do all of things at this critical moment. The example TOGA triggering function 102 is configured to cause the throttles to be pushed to 90% for an approximately 1000 to 2000 feet per min climb to clear all obstacles after take-off. The example TOGA triggering function 102 is configured to detect a hard landing using the vertical speed. If the vertical speed is greater than 1000 feet/minute and aircraft has touch down, the example TOGA triggering function 102 is configured to trigger an automatic TOGA maneuver.

Figure 6:
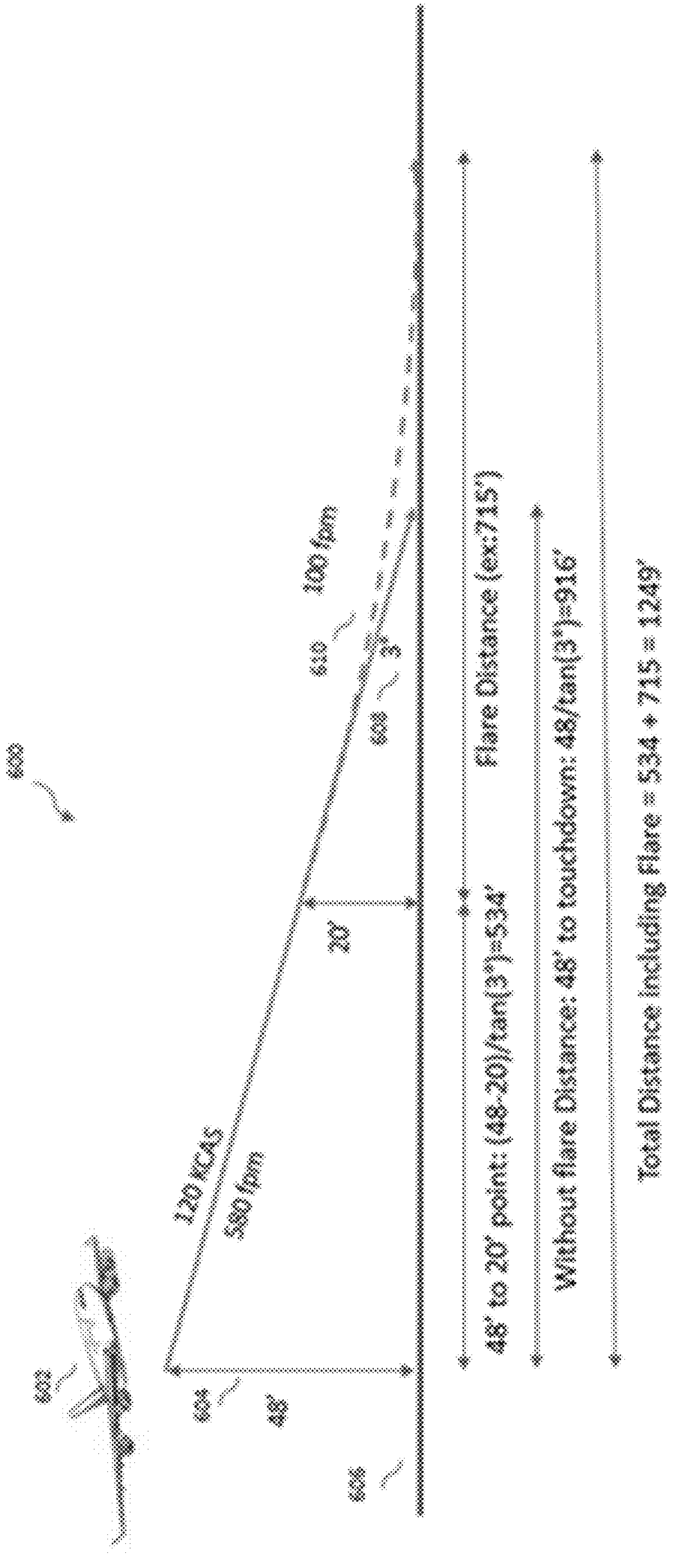
FIG. 6 is a diagram depicting a pictorial representation of example touch down point estimation calculations for a landing aircraft that considers decision height from the ground and glide path angle, in accordance with some embodiments.

In a third example, the example TOGA triggering function 102 is configured to predict whether the landing aircraft is headed toward a long landing based on the aircraft altitude exceeding threshold levels. FIG. 6 is a diagram depicting a pictorial representation of example touch down point estimation calculations for a landing aircraft 602 that considers reference starting point (for estimating distance to touchdown) 604 from the ground 606 and glide path angle 608. The flare 610 is slow and there is a smooth transition from a normal approach attitude to a landing attitude. It gradually rounds out the flightpath to one that is parallel with, and within a very few inches above the runway. Flare is generally started in normal descent at about 10 to 20 feet above the ground. This is a continuous process until the airplane 602 touches down on the ground. As an example, an aircraft flying a 3° approach at 120 KCAS is sinking 580 fpm prior to initiating the flare, which should begin around 20 feet. Without a flare, the distance to touch down from the 48-foot point can be found as follows: Distance from 48' without a flare=48 feet/tan(3°)≅916 feet. From FIG. 6, the flare is started at 20': Distance from 48' to the 20' point=(48 feet−20 feet)/tan(3°)≅534 feet. Descent is changed from 580 fpm to 100 fpm in a linear fashion and the average descent rate for the entire 20 feet comes to the average of (580+100)/2=340 fpm: Time to descend 20' at average sink rate=20 feet (60 sec/340 feet)=3.53 seconds. The distance covered in 3.53 seconds at 120 KCAS: Distance covered in the flare=3.53 seconds*(120 nm/1 hr)*(6076 feet/1 nm) (1 hr/3600 sec)≅715 feet. The height at which the aircraft crosses the threshold can have a significant impact on the airborne distance. Flying too high above the threshold can result in a long landing. An aircraft is high above the threshold when the (radio) altitude at the threshold crossing is roughly 4.5 m (15 ft.) above the normal threshold crossing height. Flying too high during the airborne maneuver can be related to un-stabilized approaches. However, also approaches that were initially stable could end up in flying too high in the final part of the approach. The height of the aircraft at the threshold is also related to the approach guidance being followed. There are two types of approach guidance namely: visual and instrument. Visual approaches are based on visual cues that the pilot can follow that will give information about whether the aircraft is on the glide slope or not. The guidance for visual approach is the Precision Approach Path Indicator (PAPI), Visual Approach Slope Indicator (VASI). The visual aid is typically based on a 3-degree glide path. It is located next to the runway as such that this path intersects the runway at a certain distance from the threshold. The threshold crossing height is now the height with the aircraft glide slope antenna centered on the glide slope.

The co-ordinates of the touch down point and the landing aircraft can be taken from the GBAS (Ground Based Augmentation System) enabled GPS (Global Positioning System) with (but not limited to GPS with GBAS alone) for predicting a long/short landing incident. In some examples the position of an aircraft on runway may be provided by the FMS and IRS. And that can be used for prediction/detection of long/short landing. When the prediction, for example, using above computations indicates long or short landing, the example TOGA triggering function 102 is configured to trigger a TOGA maneuver. The prediction is generated first at a threshold altitude and then in flare (not limited to these instances alone). At this point in time if long/short landings are predicted, the example TOGA triggering function 102 is configured to trigger a TOGA maneuver. A short landing refers to touch down before start of runway.

In a fourth example, the example TOGA triggering function 102 is configured to predict whether the landing aircraft is headed toward a long landing based on Flare Height and Floating. A properly executed flare is essential to avoiding a long landing. It is important to flare at the right altitude and hold the correct pitch attitude through touch down. When the flare is started, the rate of descent is reduced by increasing the angle of attack which also results in a decrease in airspeed. The flight-path curvature (or load factor) during the flare may be limited by the pitch control response, by the speed margin above the stall and possibly by the throttle response. Angle of attack limits the extent to which an aircraft may be allowed to float. If the flare begins too early, the airplane may float resulting in an increased landing distance. In such case, to avoid long landing due to flare height and floating, the example TOGA triggering function 102 is configured to trigger a TOGA maneuver.

To detect a longer flare time, the example TOGA triggering function 102 considers the time frame from when the aircraft is at an altitude of 20 feet (with pitch-up altitude) to the time when it touches down (on ground indication from landing gear). If the flare time is considerably higher (e.g., greater than double) than the average flare time (e.g., 3.53 sec as indicated in example 3, supra), the example TOGA triggering function 102 is configured to trigger a TOGA maneuver.

In a fifth example, the example TOGA triggering function 102 is configured to trigger a TOGA maneuver due to a late use of, not deployed, or inappropriate use of deceleration devices (e.g., wheel brakes, thrust reversers, flaps, spoilers) that it predicts will result in the aircraft not reaching a controlled speed. The controlled speed is the speed that the landing aircraft needs to decelerate to after touch down using deceleration devices to allow the aircraft to perform maneuvers on the ground.

Figure 7:
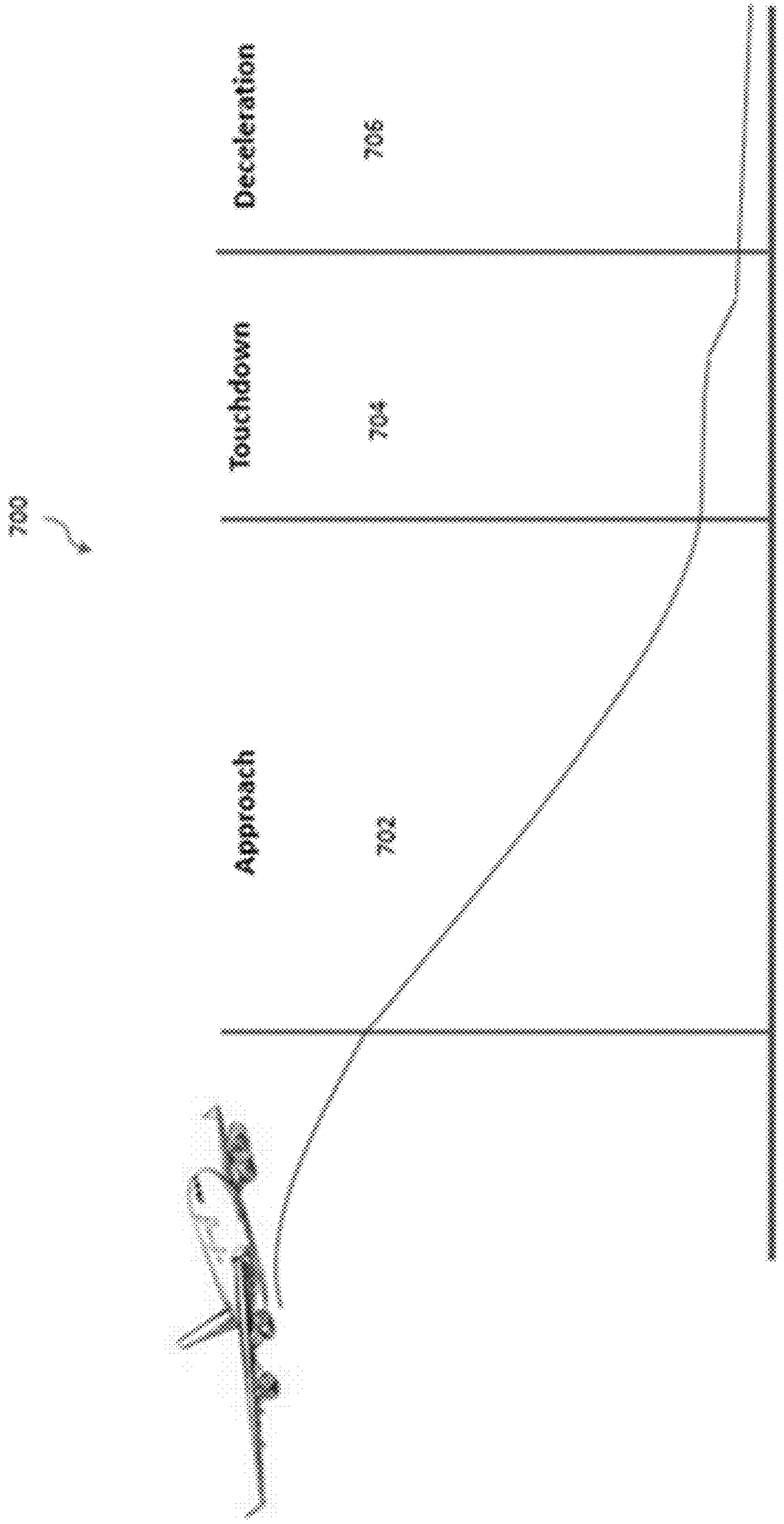
FIG. 7 is a diagram depicting example landing phases including an approach phase, a touch down phase, and a deceleration phase, in accordance with some embodiments.

FIG. 7 is a diagram depicting example landing phases including an approach phase 702, a touch down phase 704, and a deceleration phase 706. To estimate the distance from a touch down point of the landing aircraft wheels to the distance to be traveled to reach a controlled speed, the example TOGA triggering function 102 is configured to use sensor data for engine speed, position of the thrust reversers/flaps/spoilers and the force provided by the brakes. Also, these sensors can also identify a failure state for these hardware items. When the aircraft has touched the runway, the example TOGA triggering function 102 is configured to recalculate the braking distance that makes it possible to reach the controlled speed throughout the braking phase. To achieve this controlled speed in given time after landing, the aircraft should decelerate at or above a certain rate. This deceleration required is predetermined by mechanisms such as manually analyzing previous landing data, using a machine learning model to predict deceleration needed at different time intervals, or other approaches that can provide information on the appropriate deceleration needed for the aircraft to safely land on a runway without runway overshoot. If the aircraft deceleration in few seconds (e.g., 10 seconds) after landing is higher than that needed for aircraft to stop safely, the example TOGA triggering function 102 is configured to trigger a TOGA maneuver.

Consider a case in which deceleration devices (e.g., Wheel Brakes, Thrust Reversers, flaps, spoilers) are applied late or not deployed or applied inappropriately. In this scenario, an expected controlled speed of 20 knots needs to be achieved after touch down, but due to late or not deployed or inappropriate use of deceleration devices, the aircraft will not achieve the expected controlled speed of 20 knots. In such scenarios, the example TOGA triggering function 102 is configured to trigger a TOGA maneuver, before the aircraft travels a large part of the runway at a high speed.

Figure 8:
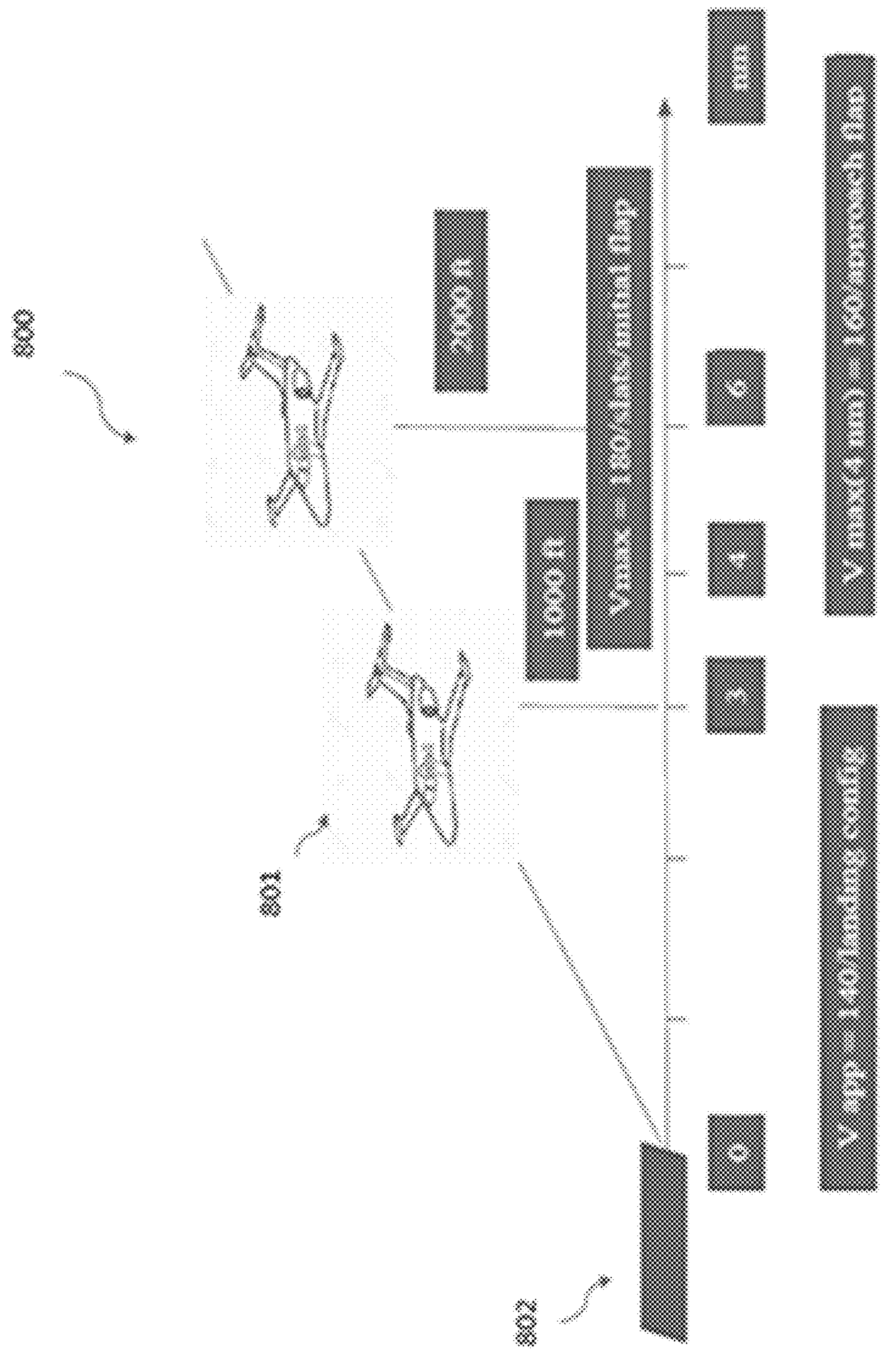
FIG. 8 is a block diagram depicting an example approach environment in which an example TOGA (take-off and go-around) triggering function is provided representing Airspeed anomaly monitoring, in accordance with some embodiments.

FIG. 8 is a block diagram depicting an example approach environment 800 in which an example TOGA (take-off and go-around) triggering function 102 is provided. In a sixth example, the TOGA triggering function 102 is configured to trigger a TOGA maneuver when the Airspeed during approach is considerably higher than a proposed approach speed for a runway. The approach speed is determined by a number of factors such as flap setting, weight of the aircraft, the headwind, turbulence, and the handling of the pilots. Based on a number of these factors a pilot typically calculates a target approach speed, which the pilot tries to fly during the approach.

During the final approach before touch down, pilots must maintain strict control of speed and rate of descent. A speed that it too high at touch down requires more stopping effort because the kinetic energy of the airplane that must be dissipated during a stop varies roughly as the square of the airplane speed. On the other hand, a speed that is too low may cause the airplane to land short of the runway.

Overspeed will lead to a long landing and the aircraft overshooting the runway. Low speed will lead to a short landing and the aircraft may crash. Hence the CAS (calibrated airspeed) should be maintained near the $V_{APP}$ (Approach Velocity). Airspeed triggered Auto TOGA is armed/activated at 1000 feet altitude for an aircraft 801 in approach and is active until touch down 802. During this active period, if the aircraft CAS is less than 5 knots or greater than 10 knots compared to the $V_{APP}$ computed, the example TOGA triggering function 102 is configured to trigger a TOGA maneuver.

In one example, $V_{APP}$ can be computed by the Auto Flight System (AFS) or inserted manually by the pilot through the FMS PERF Page. $V_{APP}$ is based on the $V_{LS}$ (Lowest Selectable Speed) of the landing configuration. For example, for an Airbus aircraft, in normal operations, the $V_{APP}$ is defined by:

$V_{APP}=V_{LS}$ Landing CONF ($V_{LS}$ of the landing configuration)+APPR COR (APPRoach CORrection).

When computed by the AFS, the APPRoach CORrection (APPR COR) used by the AFS is:

APPR COR=⅓ Headwind with 5 kt≤APPR COR≤15 kt

The flight crew can choose to insert any $V_{APP}$ by computing its own APPR CORR as follows:

APPR COR=highest of:

- 5 kt if A/THR (Auto Throttle) is ON
- 5 kt if ice accretion (10 kt instead of 5 kt on A320 family when in CONF 3)
- ⅓ Headwind excluding gust
- Flight crew speed increment (*)

with APPR COR≤15 kt (CONF 3 being configuration of A320 with flaps 20, slats 22)

During auto land or when A/THR is ON or in case of ice accretion or gusty crosswind greater than 20 kt, $V_{APP}$ must not be lower than $V_{LS}$+5 kt.

In a seventh example, the example TOGA triggering function 102 is configured to trigger a TOGA maneuver due to a Rate of descent being considerably higher than a required rate of decent for landing at 3 degree slope. In aviation based on a 3° descent rate, pilots adopted a formula to assure a slow, steady, and comfortable descent for their passengers: the rule of three or "3:1 rule of descent". This rule implies 3 NM (Nautical Miles) of travel should be allowed for every 1,000 feet (300 m) of descent. The "rule of 3" is used by pilots flying small aircraft as well as by those flying airliners. This descent gives an efficient glide descent from cruising altitude.

Descent could be started when the time to reach the point is equal to a close multiple of 1000 ft/min descent. If the final approach fix is expected to be reached at about 20 minutes and the aircraft is flying at 20000 ft, the aircraft can start its descent at 1000 ft/min in the case that altitude restrictions are not expected. If it is expected that the final approach fix will be reached in about 10 minutes and the aircraft is flying at 30000 ft, the aircraft can start its descent at 3000 ft/min in the case that altitude restrictions are not expected.

Figure 9:
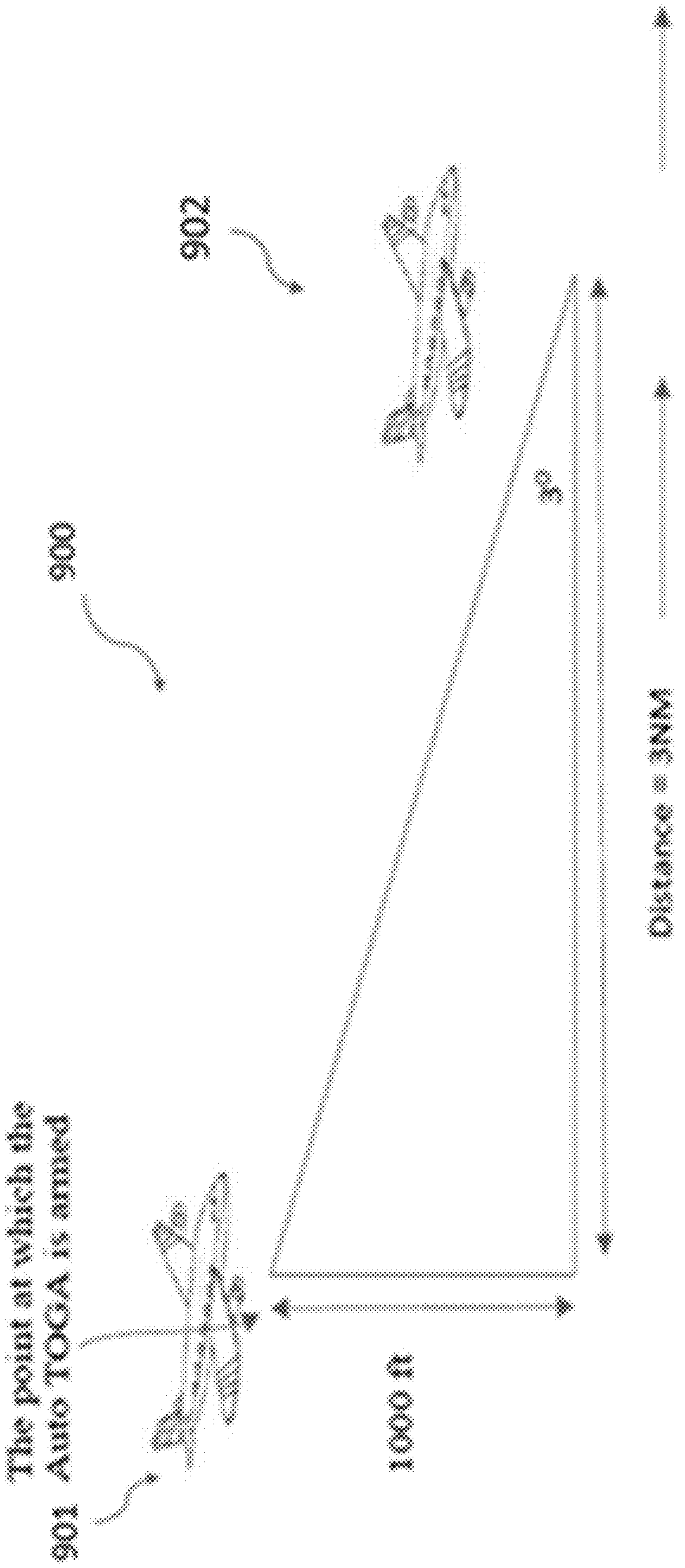
FIG. 9 is a diagram depicting example of approach environment in which an example TOGA (take-off and go-around) triggering function is provided representing Rate of Descent monitoring, in accordance with some embodiments.

FIG. 9 is a diagram depicting example of approach environment 900 in which an example TOGA (take-off and go-around) triggering function 102 is provided. In a seventh example, the example TOGA triggering function 102 is configured to trigger a TOGA maneuver due to a Rate of descent being considerably higher than a required rate of decent for landing at 3 degree slope. In aviation based on a 3° descent rate, pilots adopted a formula to assure a slow, steady, and comfortable descent for their passengers: the rule of three or "3:1 rule of descent". This rule implies 3 NM (Nautical Miles) of travel should be allowed for every 1,000 feet (300 m) of descent. The "rule of 3" is used by pilots flying small aircraft as well as by those flying airliners. This descent gives an efficient glide descent from cruising altitude.

Descent could be started when the time to reach the point is equal to a close multiple of 1000 ft/min descent. If the final approach fix is expected to be reached at about 20 minutes and the aircraft is flying at 20000 ft, the aircraft 901 can start its descent at 1000 ft/min in the case that altitude restrictions are not expected. If it is expected that the final approach fix 902 will be reached in about 10 minutes and the aircraft is flying at 30000 ft, the aircraft can start its descent at 3000 ft/min in the case that altitude restrictions are not expected.

In an eighth example, the example TOGA triggering function 102 is configured to trigger a TOGA maneuver based on rate of decent when the example TOGA triggering function 102 is armed/activated only when the flight altitude is from 1000 feet during approach and up to the point when the aircraft is in flare (10 feet). During this activation period, the example TOGA triggering function 102 is configured to trigger a TOGA maneuver any time when the rate of descent is greater than 1000 ft/min, which is unsafe for landing.

In a ninth example, the example TOGA triggering function 102 is configured to trigger a TOGA maneuver due to Excess Wind Shear. In the case of excess wind shear, pilots may use on-board weather radar and wind shear detection equipment to aid in making the land or go-around decision (include cross winds). During approach, if the wind shear is detected to be dangerously excessive, the example TOGA triggering function 102 is configured to trigger a TOGA maneuver.

In a tenth example, the example TOGA triggering function 102 is configured to trigger a TOGA maneuver due to Landing Configuration issues. A flight crew might discover a mechanical problem on final approach (e.g., in a flap or landing gear issue) and then Auto TOGA is triggered. If the landing gear is not extended during approach or if the flaps are not 30/40, the example TOGA triggering function 102 is configured to trigger a TOGA maneuver starting from 1000 feet altitude.

In an eleventh example, the example TOGA triggering function 102 is configured to trigger a TOGA maneuver due to a landing gear extension problem or delay. If the landing gear extension sequence has not completed within 30 seconds, there is a need to retract the gear and a need to wait until it has been fully stowed. Recent studies show that if the gear does not immediately deploy successfully following reselection, it may deploy normally within the next two minutes as hydraulic pressure continues to act on the gear and doors throughout this time. In such cases, the example TOGA triggering function 102 is configured to trigger a TOGA maneuver to allow the landing gear to fully retract to a stowed position and then to redeploy.

In a twelfth example, the example TOGA triggering function 102 is configured to trigger a TOGA maneuver due to an aircraft not being aligned to a runway during landing. During approach if the aircraft is not aligned to the runway, the example TOGA triggering function 102 is configured to trigger a TOGA maneuver. An aircraft can be identified as not being aligned to a runway when excessive LOC or GLIDE deviation occurs by ¼ dot LOC & 1 dot G/S, respectively.

In a thirteenth example, the example TOGA triggering function 102 is configured to trigger a TOGA maneuver due to a high bank angle during approach. During approach if the aircraft is at or below 500 feet and has a bank angle of 7°, the example TOGA triggering function 102 is configured to trigger a TOGA maneuver. 1000 feet altitude is not considered here as from there up to 500 feet there is sufficient opportunity to reduce bank angle to less than 7°.

In a fourteenth example, the example TOGA triggering function 102 is configured to trigger a TOGA maneuver due to a high pitch angle during approach. During flare if an aircraft pitch attitude goes below 0° or above 10°, the example TOGA triggering function 102 is configured to trigger an automatic TOGA advisory and when applicable also trigger a TOGA maneuver caused by the TOGA trigger condition detected.

In a fifteenth example, the example TOGA triggering function 102 is configured to work cooperatively with a Honeywell Smart Runway & Landing System (HSRLS). The HSRLS provides an aural advisory if an aircraft is approaching too high, too fast or if the aircraft is not configured for landing properly. The example TOGA triggering function 102 can be integrated with HSRLS to initiate a TOGA maneuver when the HSRLS detects a flaps, speed, or altitude issue during approach and landing.

In a sixteenth example, the example TOGA triggering function 102 is configured to trigger a TOGA due to flight critical parameter inconsistency during approach. If, for example, the ILS (instrument landing system) indicates that the aircraft in approach is aligned to the runway, but, according to GPS co-ordinates, the aircraft is not aligned to the runway, the example TOGA triggering function 102 is configured to trigger a TOGA maneuver.

Described herein are apparatus, systems, techniques, and articles for enabling or overriding an automatically triggered or coordinately triggered TOGA (take-off and go-around) maneuver during approach or landing operations. In one embodiment, a flight deck system for enabling or overriding an automatically triggered or coordinately triggered TOGA (take-off and go-around) maneuver during approach or landing operations is provided. The flight deck system comprises a controller configured to: arm an automatic TOGA flight operating mode when a predetermined TOGA arming condition has been detected; and monitor, after the automatic TOGA flight operating mode has been armed, for a TOGA trigger condition. Wherein when operating in a first mode and a TOGA trigger condition has been detected that has not been overridden within a predetermined trigger condition overriding time, the controller is configured to: generate and cause a TOGA advisory to be provided to flight crew that informs of the detected trigger condition and advises that an automatic TOGA maneuver will be executed, and trigger and cause the automatic TOGA maneuver to be executed if the automatic TOGA maneuver has not been overridden by flight crew action. Wherein when operating in a second mode and a TOGA trigger condition has been detected that has not been overridden within a predetermined trigger condition overriding time, the controller is configured to: generate and cause a TOGA advisory to be provided to flight crew that informs of the detected trigger condition and advises the flight crew to manually trigger a TOGA maneuver, and trigger and cause a TOGA maneuver to be executed if the flight crew neither manually triggers nor overrides the TOGA maneuver within a predetermined period of time. And wherein when operating in a third mode and a TOGA trigger condition has been detected that has not been overridden within a predetermined trigger condition overriding time, the controller is configured to generate and cause a TOGA advisory to be provided to flight crew that informs of the detected trigger condition and advises the flight crew to manually trigger a TOGA maneuver if the automatic TOGA trigger is not overridden by flight crew.

These aspects and other embodiments may include one or more of the following features. The first mode is used when the aircraft is configured to allow the first mode and provides an autopilot function, an auto-land function, or other similar mode or function with sufficient flight integrity to automatically carry out TOGA for the aircraft. The second mode is used when the aircraft is configured to allow the second mode and provides an autopilot function, an auto-land function, or other similar mode or function with sufficient flight integrity to carry out TOGA for the aircraft with flight crew preference for triggering TOGA. The third mode is used when the aircraft is configured to allow the third mode when sufficient flight integrity is not existing in the form of autopilot function, an auto-land function, or other similar mode or function. The controller may be further configured to provide an option to override the Auto TOGA trigger which when overridden disables the detection of conditions triggering Auto TOGA Advisory and maneuver, and also disables the automatic execution of Auto TOGA maneuver. The TOGA arming condition may comprise another state such as one or more listed in Table 1, supra. To monitor for a TOGA trigger condition, the controller may be configured to monitor object detection data for a runway targeted for landing for a potential incursion threat. To monitor object detection data the controller may be configured to analyze the object detection data to determine whether an object has been identified, the type of any object identified, and whether any identified object is an incursion threat. The object detection data may comprise one or more of: LIDAR, RADAR, camera, ADS-B, ASDE-X, ASMGS, electro-optical or infrared sensor data. The potential incursion threat may comprise one or more of another aircraft, a ground vehicle, an animal, trash, aircraft debris, vehicle debris, a rock, and others. To monitor for a TOGA trigger condition, the controller may be further configured to monitor information associated with aircraft safe landing to determine the occurrence of one or more TOGA trigger conditions. The one or more TOGA trigger conditions determined from monitoring information associated with aircraft safe landing may comprise one or more of: an aircraft hard bounce during an attempted landing; a predicted aircraft long landing caused by altitude over a threshold level; a predicted aircraft long landing caused by longer flare; a predicted aircraft long or short landing caused by a reason leading to an unstabilized approach; a late, non-deployed, or inappropriate use of a deceleration device; an airspeed being considerably higher than a proposed approach speed for the runway; a rate of descent that is too high for a required rate of decent for landing at 3 degree slope; a dangerously excessive wind shear; a landing configuration issue; a landing gear extension problem or delay; the aircraft not being aligned to the targeted runway during landing; a bank angle being too high during approach; a pitch angle being too high during approach; or a flight critical parameter being inconsistent during approach. The controller may be further configured to: determine, after a TOGA trigger condition has been detected, whether the flight crew has overridden the TOGA trigger condition within a predetermined trigger condition overriding time; wait a predetermined duration if override is fresh or wait a remaining time to complete a last override duration; and continue to monitor for a TOGA trigger condition, when it has been determined that a TOGA trigger condition has been detected and the flight crew had overridden a previously detected TOGA trigger condition within the predetermined trigger condition overriding time.

In another embodiment, a processor-implemented method in an aircraft for enabling or overriding an automatically triggered or coordinately triggered TOGA (take-off and go-around) maneuver during approach or landing operations is provided. The method comprises: arming, by the processor, an automatic TOGA flight operating mode when a predetermined TOGA arming condition has been detected; and monitoring, by the processor, after the automatic TOGA flight operating mode has been armed, for a TOGA trigger condition. Wherein when operating in a first mode and a TOGA trigger condition has been detected that has not been overridden within a predetermined trigger condition overriding time, the method further comprises: generating and causing a TOGA advisory to be provided to flight crew that informs of the detected trigger condition and advises that an automatic TOGA maneuver will be executed, and triggering and causing the automatic TOGA maneuver to be executed if the automatic TOGA maneuver has not been overridden by flight crew action. Wherein when operating in a second mode and a TOGA trigger condition has been detected that has not been overridden within a predetermined trigger condition overriding time, the method further comprises: generating and causing a TOGA advisory to be provided to flight crew that informs of the detected trigger condition and advises the flight crew to manually trigger a TOGA maneuver, and triggering and causing a TOGA maneuver to be executed if the flight crew neither manually triggers nor overrides the automatic TOGA maneuver within a predetermined period of time. And wherein when operating in a third mode and a TOGA trigger condition has been detected that has not been overridden within a predetermined trigger condition overriding time, the method further comprises generating and causing a TOGA advisory to be provided to flight crew that informs of the detected trigger condition and advises the flight crew to manually trigger a TOGA maneuver if the automatic TOGA trigger is not overridden by flight crew.

These aspects and other embodiments may include one or more of the following features. The mode is used when the aircraft is configured to allow the first mode and provides an autopilot function, an auto-land function, or other similar mode or function with sufficient flight integrity to automatically carry out TOGA for the aircraft. The second mode is used when the aircraft is configured to allow the second mode and provides an autopilot function, an auto-land function, or other similar mode or function with sufficient flight integrity to carry out TOGA for the aircraft with flight crew preference for triggering TOGA. The third mode is used when the aircraft is configured to allow the third mode when sufficient flight integrity is not existing in the form of autopilot function, an auto-land function, or other similar mode or function. The TOGA arming condition may comprise a state wherein the aircraft is in approach and at 1000 feet altitude. The method may further comprise providing an option to override the Auto TOGA trigger which when overridden disables the detection of conditions triggering Auto TOGA Advisory and maneuver, and also disables the automatic execution of Auto TOGA maneuver. The TOGA arming condition may comprise another state such as one or more listed in Table 1, supra. Monitoring for a TOGA trigger condition may comprise monitoring object detection data for a runway targeted for landing for a potential incursion threat. Monitoring object detection data may comprise analyzing the object detection data to determine whether an object has been identified, the type of any object identified, and whether any identified object is an incursion threat. The object detection data may comprise one or more of: LIDAR, RADAR, camera, ADS-B, ASDE-X, ASMGS, Electro-Optical or Infrared Sensor data. The potential incursion threat may comprise one or more of another aircraft, a ground vehicle, an animal, trash, aircraft debris, vehicle debris, a rock, and others. Monitoring for a TOGA trigger condition may comprise monitoring information associated with aircraft safe landing to determine the occurrence of one or more TOGA trigger conditions. The one or more TOGA trigger conditions determined from monitoring information associated with aircraft safe landing may comprise one or more of: an aircraft hard bounce during an attempted landing; a predicted aircraft long landing caused by altitude over a threshold level; a predicted aircraft long landing caused by longer flare; a predicted aircraft long or short landing caused by a reason leading to an un-stabilized approach; a late, non-deployed, or inappropriate use of a deceleration device; an airspeed being considerably higher than a proposed approach speed for the runway; a rate of descent that is too high for a required rate of decent for landing at 3 degree slope; a dangerously excessive wind shear; a landing configuration issue; a landing gear extension problem or delay; the aircraft not being aligned to the targeted runway during landing; a bank angle being too high during approach; a pitch angle being too high during approach; or a flight critical parameter being inconsistent during approach. The method may further comprise determining, after a TOGA trigger condition has been detected, whether the flight crew has overridden the TOGA trigger condition within a predetermined trigger condition overriding time, wait a predetermined duration if override is fresh or wait a remaining time to complete a last override duration; and continuing to monitor for a TOGA trigger condition, when it has been determined that a TOGA trigger condition has been detected and the flight crew had overridden a previously detected TOGA trigger condition within the predetermined trigger condition overriding time.

In another embodiment, provided is a non-transitory computer-readable medium having stored thereon instructions that when executed by a processor cause the processor to perform a method in an aircraft for enabling or overriding an automatically triggered or coordinately triggered TOGA (take-off and go-around) maneuver during approach or landing operations. The method comprises: arming an automatic TOGA flight operating mode when a predetermined TOGA arming condition has been detected; and monitoring, after the automatic TOGA flight operating mode has been armed, for a TOGA trigger condition. When operating in a first mode and a TOGA trigger condition has been detected that has not been overridden within a predetermined trigger condition overriding time, the method further comprises:

generating and causing a TOGA advisory to be provided to flight crew that informs of the detected trigger condition and advises that an automatic TOGA maneuver will be executed, and triggering and causing the automatic TOGA maneuver to be executed if the automatic TOGA maneuver has not been overridden by flight crew action. When operating in a second mode and a TOGA trigger condition has been detected that has not been overridden within a predetermined trigger condition overriding time, the method further comprises: generating and causing a TOGA advisory to be provided to flight crew that informs of the detected trigger condition and advises the flight crew to manually trigger a TOGA maneuver, and triggering and causing a TOGA maneuver to be executed if the flight crew neither manually triggers nor overrides the automatic TOGA maneuver within a predetermined period of time. And, when operating in a third mode and a TOGA trigger condition has been detected that has not been overridden within a predetermined trigger condition overriding time, the method further comprises generating and causing a TOGA advisory to be provided to flight crew that informs of the detected trigger condition and advises the flight crew to manually trigger a TOGA maneuver if the automatic TOGA trigger is not overridden by flight crew.

These aspects and other embodiments may include one or more of the following features. The mode is used when the aircraft is configured to allow the first mode and provides an autopilot function, an auto-land function, or other similar mode or function with sufficient flight integrity to automatically carry out TOGA for the aircraft. The second mode is used when the aircraft is configured to allow the second mode and provides an autopilot function, an auto-land function, or other similar mode or function with sufficient flight integrity to carry out TOGA for the aircraft with flight crew preference for triggering TOGA. And the third mode is used when the aircraft is configured to allow the third mode or sufficient flight integrity is not existing in the form of autopilot function, an auto-land function, or other similar mode or function. The TOGA arming condition may comprise a state wherein the aircraft is in approach and at 1000 feet altitude. The TOGA arming condition may comprise another state such as one or more listed in Table 1, supra. Monitoring for a TOGA trigger condition may comprise monitoring object detection data for a runway targeted for landing for a potential incursion threat. Monitoring object detection data may comprise analyzing the object detection data to determine whether an object has been identified, the type of any object identified, and whether any identified object is an incursion threat. The object detection data may comprise one or more of: LIDAR, RADAR, camera, ADS-B, ASDE-X, ASMGS, Electro-Optical or Infrared Sensor data. The potential incursion threat may comprise one or more of another aircraft, a ground vehicle, an animal, trash, aircraft debris, vehicle debris, a rock, and others. Monitoring for a TOGA trigger condition may comprise monitoring information associated with aircraft safe landing to determine the occurrence of one or more TOGA trigger conditions. The one or more TOGA trigger conditions determined from monitoring information associated with aircraft safe landing may comprise one or more of: an aircraft hard bounce during an attempted landing; a predicted aircraft long landing caused by altitude over a threshold level; a predicted aircraft long landing caused by longer flare; a predicted aircraft long or short landing caused by a reason leading to an un-stabilized approach; a late, non-deployed, or inappropriate use of a deceleration device; an airspeed being considerably higher than a proposed approach speed for the runway; a rate of descent that is too high for a required rate of decent for landing at 3 degree slope; a dangerously excessive wind shear; a landing configuration issue; a landing gear extension problem or delay; the aircraft not being aligned to the targeted runway during landing; a bank angle being too high during approach; a pitch angle being too high during approach; or a flight critical parameter being inconsistent during approach. The method may further comprise determining, after a TOGA trigger condition has been detected, whether the flight crew has overridden the TOGA trigger condition within a predetermined trigger condition overriding time, wait a predetermined duration if override is fresh or wait a remaining time to complete a last override duration; and continuing to monitor for a TOGA trigger condition, when it has been determined that a TOGA trigger condition has been detected and the flight crew had overridden a previously detected TOGA trigger condition within the predetermined trigger condition overriding time.

A flight deck system for enabling or overriding an automatically triggered or coordinately triggered TOGA (take-off and go-around) maneuver during approach or landing operations is provided. The flight deck system comprises a controller configured to: monitor information associated with aircraft safe landing to determine if a predetermined TOGA arming condition (e.g., aircraft is in approach and at 1000 feet altitude) exists; arm an automatic TOGA flight operating mode when a predetermined TOGA arming condition has been detected; monitor, after the automatic TOGA flight operating mode has been armed, for a TOGA trigger condition, wherein to monitor for a TOGA trigger condition, the controller is configured to: monitor object detection data (e.g., LIDAR, RADAR, camera-based data, ADS-B, ASDE-X, ASMGS, Electro-Optical and Infrared Sensors) for a runway targeted for landing from which potential incursion threats (e.g., aircraft or ground vehicle, animal, trash, debris, and others) may be assessed, and analyze the object detection data to determine whether an object has been identified, the type of any object identified, and whether any identified object is an incursion threat; and monitor information associated with aircraft safe landing to determine the occurrence of one or more TOGA trigger conditions, wherein the TOGA trigger conditions include: (i) an aircraft hard bounce during an attempted landing; (ii) prediction of aircraft long landing caused by altitude over threshold levels; (iii) prediction of aircraft long landing caused by longer flare; (iv) a predicted aircraft long or short landing caused by a reason leading to an un-stabilized approach; (v) late or not deployed or inappropriate use of deceleration devices; (vi) airspeed being considerably higher than the proposed approach speed for the runway; (vii) rate of descent being considerably higher than the required rate of decent for landing at 3 degree slope; (viii) dangerously excessive Wind Shear; (ix) Landing Configuration issues; (x) Landing Gear Extension problem or delay; (xi) Aircraft not aligned to runway during landing; (xii) High bank angle during approach; (xiii) High pitch angle during approach; and (xiv) Flight critical parameter inconsistent during approach; generate an aural TOGA advisory to flight crew to inform of a detected trigger condition after a trigger condition is detected; determine, after a TOGA trigger condition has been detected, whether flight crew had overridden the TOGA trigger condition within a predetermined trigger condition overriding time; continue to monitor for a TOGA trigger condition, when it has been determined that a TOGA trigger condition has been detected and that flight crew had overridden a previously detected TOGA trigger condition within the predetermined trigger condition overriding time; provide the TOGA advisory to flight crew to inform of the detected trigger condition and advise that an automatic TOGA will be executed, and trigger and execute the automatic TOGA after the TOGA trigger condition has been detected when an autopilot function, Auto-land function, or other similar mode or function with sufficient flight integrity is active or available, and flight crew has not overridden the TOGA trigger condition within the predetermined trigger condition overriding time; provide the TOGA advisory to flight crew to inform of the detected trigger condition; and provide the TOGA advisory to flight crew to inform of the detected trigger condition and to advise flight crew to manually trigger TOGA, and automatically execute the TOGA if the flight crew neither triggered TOGA manually nor overrode the TOGA advisory in a predetermined time period when autopilot/Auto-land is active.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system in an aircraft, the flight deck system comprising a controller, the controller configured to:

implement a TOGA (take-off and go-around) triggering function having a first mode, a second mode and a third mode during approach or landing operations;

provide an option for allowing a flight crew member to override a specific TOGA trigger condition;

override an automatically triggered or coordinately triggered TOGA maneuver responsive to flight crew action to override TOGA arming;

monitor aircraft data and sensor data for a runway targeted for landing for a TOGA trigger condition involving a potential incursion threat, wherein a potential incursion threat includes one or more of another aircraft, a ground vehicle, an animal, trash, debris, or a rock;

monitor aircraft state information for a TOGA trigger condition not involving a potential incursion threat, wherein a TOGA trigger condition not involving a potential incursion threat comprises one or more of: an aircraft hard bounce during an attempted landing; a predicted aircraft long landing caused by altitude over a threshold level; a predicted aircraft long landing caused by longer flare; a predicted aircraft long or short landing caused by a reason leading to an un-stabilized approach; a late, non-deployed, or inappropriate use of a deceleration device; an airspeed being considerably higher than a proposed approach speed for the runway; a rate of descent that is too high for a required rate of decent for landing at 3 degree slope; a dangerously excessive wind shear; a landing configuration issue; a landing gear extension problem or delay; a bank angle being too high during approach; a pitch angle being too high during approach; or a flight critical parameter being inconsistent during approach;

responsive to detecting a TOGA trigger condition not involving a potential incursion threat, in the first mode, generate and cause a TOGA advisory to be provided to flight crew that informs of a detected trigger condition and advises that an automatic TOGA maneuver will be executed, trigger and cause the automatic TOGA maneuver to be executed if the automatic TOGA maneuver has not been overridden by flight crew action, and override the automatic TOGA maneuver responsive to flight crew override of TOGA arming;

responsive to detecting a TOGA trigger condition not involving a potential incursion threat, in the second mode, generate and cause a TOGA advisory to be provided to flight crew that informs of the detected trigger condition and advises the flight crew to manually trigger a TOGA maneuver, trigger and cause a TOGA maneuver to be executed if the flight crew neither manually triggers nor overrides execution of an automatic TOGA maneuver within a predetermined period of time, and override the automatic TOGA maneuver responsive to flight crew override of TOGA arming; and responsive to detecting a TOGA trigger condition not involving a potential incursion threat, in the third mode, generate and cause a TOGA advisory to be provided to flight crew that informs of the detected trigger condition and advises the flight crew to manually trigger a TOGA maneuver.

2. The flight deck system of claim 1, wherein:

the first mode is used when the aircraft is configured to allow the first mode and provides an autopilot function, an auto-land function, or other similar mode or function with sufficient flight integrity to automatically carry out TOGA for the aircraft;

the second mode is used when the aircraft is configured to allow the second mode and provides an autopilot function, an auto-land function, or other similar mode or function with sufficient flight integrity to carry out TOGA for the aircraft with flight crew preference for triggering TOGA, and the third mode is used when sufficient flight integrity is not existing for an autopilot function, an auto-land function, or other similar mode or function.

3. The flight deck system of claim 1, wherein to provide an option for allowing a flight crew member to override a specific TOGA condition the controller is configured to provide a predetermined trigger condition overriding time for the flight crew to use to override a trigger condition before the TOGA triggering function acts on a determination that a trigger condition has been detected, wherein when overridden, the TOGA triggering function disables the detection of the specific TOGA condition.

4. The flight deck system of claim 1, wherein to monitor for a TOGA trigger condition involving a potential incursion threat, the controller is configured to monitor object detection data for a runway targeted for landing for a potential incursion threat.

5. The flight deck system of claim 4, wherein to monitor object detection data the controller is configured to analyze the object detection data to determine whether an object has been identified, type of any object identified, and whether any identified object is an incursion threat.

6. The flight deck system of claim 4, wherein the object detection data comprises one or more of: LIDAR, RADAR, camera, ADS-B, ASDE-X, ASMGS, electro-optical or infrared sensor data.

7. The flight deck system of claim 1, wherein the controller is further configured to:

determine, after a TOGA trigger condition has been detected, whether the flight crew has overridden the TOGA trigger condition within a predetermined trigger condition overriding time;

wait a predetermined duration if override is fresh or wait a remaining time to complete a last override duration; and continue to monitor for a TOGA trigger condition, when it has been determined that a TOGA trigger condition has been detected and the flight crew had overridden a previously detected TOGA trigger condition within the predetermined trigger condition overriding time.

8. A processor-implemented method in an aircraft, the method comprising:

implementing a TOGA (take-off and go-around) triggering function having a first mode, a second mode and a third mode during approach or landing operations;

providing an option for allowing a flight crew member to override a specific TOGA trigger condition;

overriding an automatically triggered or coordinately triggered TOGA maneuver responsive to flight crew action to override TOGA arming;

monitoring, by a processor, aircraft data and sensor data for a runway targeted for landing for a TOGA trigger condition involving a potential incursion threat, wherein a potential incursion threat includes one or more of another aircraft, a ground vehicle, an animal, trash, debris, or a rock;

monitoring aircraft state information for a TOGA trigger condition not involving a potential incursion threat, wherein a TOGA trigger condition not involving a potential incursion threat comprises one or more of: an aircraft hard bounce during an attempted landing; a predicted aircraft long landing caused by altitude over a threshold level; a predicted aircraft long landing caused by longer flare; a predicted aircraft long or short landing caused by a reason leading to an un-stabilized approach; a late, non-deployed, or inappropriate use of a deceleration device; an airspeed being considerably higher than a proposed approach speed for the runway; a rate of descent that is too high for a required rate of decent for landing at 3 degree slope; a dangerously excessive wind shear; a landing configuration issue; a landing gear extension problem or delay; a bank angle being too high during approach; a pitch angle being too high during approach; or a flight critical parameter being inconsistent during approach;

responsive to detecting a TOGA trigger condition not involving a potential incursion threat, in a first mode, generating and causing a TOGA advisory to be provided to flight crew that informs of the detected trigger condition and advises that an automatic TOGA maneuver will be executed, triggering and causing the automatic TOGA maneuver to be executed if the automatic TOGA maneuver has not been overridden by flight crew action, and overriding the automatic TOGA maneuver responsive to flight crew override of TOGA arming;

responsive to detecting a TOGA trigger condition not involving a potential incursion threat, in a second mode, generating and causing a TOGA advisory to be provided to flight crew that informs of the detected trigger condition and advises the flight crew to manually trigger a TOGA maneuver, triggering and causing a TOGA maneuver to be executed if the flight crew neither manually triggers nor overrides execution of an automatic TOGA maneuver within a predetermined period of time, and overriding the automatic TOGA maneuver responsive to flight crew override of TOGA arming; and responsive to detecting a TOGA trigger condition not involving a potential incursion threat, in a third mode, generating and causing a TOGA advisory to be provided to flight crew that informs of the detected trigger condition and advises the flight crew to manually trigger a TOGA maneuver.

9. The method of claim 8, wherein:

the first mode is used when the aircraft is configured to allow the first mode and provides an autopilot function, an auto-land function, or other similar mode or function with sufficient flight integrity to automatically carry out TOGA for the aircraft;

the second mode is used when the aircraft is configured to allow the second mode and provides an autopilot function, an auto-land function, or other similar mode or function with sufficient flight integrity to carry out TOGA for the aircraft with flight crew preference for triggering TOGA, and the third mode is used when sufficient flight integrity is not existing for an autopilot function, an auto-land function, or other similar mode or function.

10. The method of claim 8, wherein monitoring for a TOGA trigger condition involving a potential incursion threat comprises monitoring object detection data for a runway targeted for landing for a potential incursion threat.

11. The method of claim 10, wherein monitoring object detection data comprises analyzing the object detection data to determine whether an object has been identified, type of any object identified, and whether any identified object is an incursion threat.

12. The method of claim 10, wherein the object detection data comprises one or more of: LIDAR, RADAR, camera, ADS-B, ASDE-X, ASMGS, electro-optical or infrared sensor data.

13. The method of claim 8, wherein providing an option for allowing a flight crew member to override a specific TOGA condition comprises providing a predetermined trigger condition overriding time for the flight crew to use to override a trigger condition before the TOGA triggering function acts on a determination that a trigger condition has been detected, wherein when overridden, the TOGA triggering function disables the detection of the specific TOGA condition.

14. The method of claim 8, further comprising determining, after a TOGA trigger condition has been detected, whether the flight crew has overridden the TOGA trigger condition within a predetermined trigger condition overriding time, waiting a predetermined duration if override is fresh or waiting a remaining time to complete a last override duration; and continuing to monitor for a TOGA trigger condition, when it has been determined that a TOGA trigger condition has been detected and the flight crew had overridden a previously detected TOGA trigger condition within the predetermined trigger condition overriding time.

15. A non-transitory computer-readable medium having stored thereon instructions that when executed by a processor causes the processor to perform a method in an aircraft, the method comprising:

implementing a TOGA (take-off and go-around) triggering function having a first mode, a second mode and a third mode during approach or landing operations;

providing an option for allowing a flight crew member to override a specific TOGA trigger condition;

overriding an automatically triggered or coordinately triggered TOGA maneuver responsive to flight crew action to override TOGA arming;

monitoring aircraft data and sensor data for a runway targeted for landing for a TOGA trigger condition involving a potential incursion threat, wherein a potential incursion threat includes one or more of another aircraft, a ground vehicle, an animal, trash, debris, or a rock;

monitoring aircraft state information for a TOGA trigger condition not involving a potential incursion threat, wherein a TOGA trigger condition not involving a potential incursion threat comprises one or more of: an aircraft hard bounce during an attempted landing; a predicted aircraft long landing caused by altitude over a threshold level; a predicted aircraft long landing caused by longer flare; a predicted aircraft long or short landing caused by a reason leading to an un-stabilized approach; a late, non-deployed, or inappropriate use of a deceleration device; an airspeed being considerably higher than a proposed approach speed for the runway; a rate of descent that is too high for a required rate of decent for landing at 3 degree slope; a dangerously excessive wind shear; a landing configuration issue; a landing gear extension problem or delay; a bank angle being too high during approach; a pitch angle being too high during approach; or a flight critical parameter being inconsistent during approach;

responsive to detecting a TOGA trigger condition not involving a potential incursion threat, in a first mode, generating and causing a TOGA advisory to be provided to flight crew that informs of the detected trigger condition and advises that an automatic TOGA maneuver will be executed, triggering and causing the automatic TOGA maneuver to be executed if the automatic TOGA maneuver has not been overridden by flight crew action, and overriding the automatic TOGA maneuver responsive to flight crew override of TOGA arming;

responsive to detecting a TOGA trigger condition not involving a potential incursion threat, in a second mode, generating and causing a TOGA advisory to be provided to flight crew that informs of the detected trigger condition and advises the flight crew to manually trigger a TOGA maneuver, triggering and causing a TOGA maneuver to be executed if the flight crew neither manually triggers nor overrides execution of an automatic TOGA maneuver within a predetermined period of time, and overriding the automatic TOGA maneuver responsive to flight crew override of TOGA arming; and responsive to detecting a TOGA trigger condition not involving a potential incursion threat, in a third mode, generating and causing a TOGA advisory to be provided to flight crew that informs of the detected trigger condition and advises the flight crew to manually trigger a TOGA maneuver.

16. The non-transitory computer-readable medium of claim 15, wherein:

the first mode is used when the aircraft is configured to allow the first mode and provides an autopilot function, an auto-land function, or other similar mode or function and sufficient flight integrity to automatically carry out TOGA for the aircraft;

the second mode is used when the aircraft is configured to allow the second mode and provides an autopilot function, an auto-land function, or other similar mode or function and sufficient flight integrity to carry out TOGA for the aircraft with flight crew preference for triggering TOGA, and the third mode is used when sufficient flight integrity is not existing for an autopilot function, an auto-land function, or other similar mode or function.

17. The non-transitory computer-readable medium of claim 15, wherein providing an option for allowing a flight crew member to override a specific TOGA condition comprises providing a predetermined trigger condition overriding time for the flight crew to use to override a trigger condition before the TOGA triggering function acts on a determination that a trigger condition has been detected, wherein when overridden, the TOGA triggering function disables the detection of the specific TOGA condition.

18. The non-transitory computer-readable medium of claim 15, wherein monitoring for a TOGA trigger condition involving a potential incursion threat comprises monitoring object detection data for a runway targeted for landing for a potential incursion threat.

19. The non-transitory computer-readable medium of claim 18, wherein monitoring object detection data comprises analyzing the object detection data to determine whether an object has been identified, type of any object identified, and whether any identified object is an incursion threat.

20. The non-transitory computer-readable medium of claim 15, wherein the method further comprises determining, after a TOGA trigger condition has been detected, whether the flight crew has overridden the TOGA trigger condition within a predetermined trigger condition overriding time, waiting a predetermined duration if override is fresh or waiting a remaining time to complete a last override duration; and continuing to monitor for a TOGA trigger condition, when it has been determined that a TOGA trigger condition has been detected and the flight crew had overridden a previously detected TOGA trigger condition within the predetermined trigger condition overriding time.

* * * * *